(12) United States Patent
Kicklighter et al.

(10) Patent No.: US 6,701,131 B2
(45) Date of Patent: Mar. 2, 2004

(54) INTERNATIONAL UNIVERSAL CALL PROGRESS ANALYSIS SYSTEM

(75) Inventors: Kevin C. Kicklighter, Centerville, MA (US); Franz Weller, Harwichport, MA (US)

(73) Assignee: Excel Switching Corporation, Hyannis, MA (US)

( * ) Notice: Subject to any disclaimer, the term of this patent is extended or adjusted under 35 U.S.C. 154(b) by 568 days.

(21) Appl. No.: 09/761,975

(22) Filed: Jan. 17, 2001

(65) Prior Publication Data

US 2002/0031205 A1 Mar. 14, 2002

Related U.S. Application Data

(63) Continuation-in-part of application No. 08/835,126, filed on Apr. 4, 1997, now abandoned.

(51) Int. Cl.[7] ................................................. H04Q 7/10
(52) U.S. Cl. ................................ 455/67.11; 455/226.1; 455/227; 455/560; 370/408; 370/362; 379/39.02
(58) Field of Search ........................... 455/14, 17, 500, 455/3.04, 67.11, 39, 324, 71, 553.1, 554.1, 560, 136, 157.1, 161, 182.1, 226.1, 227; 320/408, 362, 352, 463, 489; 379/39.2, 93.05, 93.07, 93.08, 93.09

(56) References Cited

U.S. PATENT DOCUMENTS

| | | | | | |
|---|---|---|---|---|---|
| 5,349,579 A | * | 9/1994 | Madonna et al. | ............ | 370/259 |
| 5,968,158 A | * | 10/1999 | Andrews et al. | ............ | 710/260 |
| 6,373,849 B1 | * | 4/2002 | Noonan | ...................... | 370/408 |
| 6,381,239 B1 | * | 4/2002 | Atkinson et al. | ............ | 370/362 |
| 6,470,028 B1 | * | 10/2002 | Perry et al. | .................. | 370/466 |
| 6,594,685 B1 | * | 7/2003 | Mishra et al. | .............. | 709/203 |
| 6,603,757 B1 | * | 8/2003 | Locascio | ..................... | 370/352 |

* cited by examiner

Primary Examiner—Pablo N. Tran

(57) ABSTRACT

A call progress analysis system is provided which is generic to any telecommunications system with which it is used due to configurable detection parameters. A signal on a channel of the telecommunications system is detected in intervals of changing frequency composition and compared to stored pattern descriptors, each of which defines a different call progress signal. In an alternative embodiment of the invention, a frequency mask is computed that is specific to a user-defined call progress analysis class. This frequency mask is used to make the DSP receiver ignore frequencies that are not part of any call progress pattern in a particular class. The frequency mask can be used in a frequency detection mode or an energy detection mode. In either mode, the detector can be customized for each channel.

28 Claims, 16 Drawing Sheets

FIG. 2

| PARAMETERS FOR PATTERN DESCRIPTORS | |
|---|---|
| Pattern ID | Identifier of the pattern (decimal #) |
| Tone Group ID | Identifier of the tone groups of which pattern is a member (decimal #) |
| Mode Bits | Action flags available (series of on/off bits) |
| Report on Cycle Lost | Output for error on unconfirmed signal (alphanumeric message to be reported) |
| Cycles to Validate | Number of cycles required to confirm (decimal #) - designated "INTMIN" |
| Min Cycles to Report | Minimum number of cycles required to report anything (decimal #) |
| Interval Count | Number of intervals which describe pattern (decimal #) |
| freq_ints[0].toneid<br>freq_ints[0].min<br><br>freq_ints[0].max | ID of 1ST interval tone (decimal #)<br>minimum duration of tone in 1ST interval (decimal time in milliseconds)<br>maximum duration of tone in 1ST interval (decimal time in milliseconds) |
| freq_ints[1].toneid<br>freq_ints[1].min<br><br>freq_ints[1].max | ID of 2ND interval tone (decimal #)<br>minimum duration of tone in 2ND interval (decimal time in milliseconds)<br>maximum duration of tone in 2ND interval (decimal time in milliseconds) |
| ⋮ | ⋮ |
| freq_ints[n-1].toneid<br>freq_ints[n-1].min<br><br>freq_ints[n-1].max | ID of nth interval tone (decimal #)<br>minimum duration of tone in nth interval (decimal time in milliseconds)<br>maximum duration of tone in nth interval (decimal time in milliseconds) |

FIG. 3

| PARAMETERS FOR TONE DESCRIPTORS | |
|---|---|
| Tone ID | Identifier of the tone (decimal #) |
| freq.cnt. | Number of frequencies in tone (decimal #) |
| freq_dbm[0].frequency<br>freq_dbm[0].dbm | 1ST frequency in tone (decimal # in Hz)<br>Minimum required signal strength of 1ST frequency (decimal # in -dBm) |
| freq_dbm[1].frequency<br>freq_dbm[1].dbm | 2ND frequency in tone (decimal # in Hz)<br>Minimum required signal strength of 1ST frequency (decimal # in -dBm) |
| ⋮<br>freq_dbm[n].frequency<br>freq_dbm[n].dbm | ⋮<br>nth frequency in tone (decimal # in Hz)<br>Minimum required signal strength of 1ST frequency (decimal # in -dBm) |

FIG. 3A

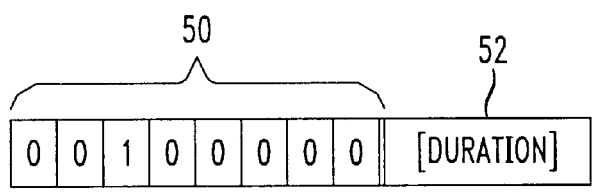

*FIG. 12*

| GLOBAL PARAMETERS | |
|---|---|
| glob.start_delay | Delay STRTDLY in program after request by host (milliseconds) |
| glob.max_silence_wait | Maximum wait for any period of silence (milliseconds) |
| glob.not_deter_max | Maximum wait NDMAX for not-determined state (milliseconds) |
| glob.deter_max | Maximum wait DMAX for determined state (milliseconds) |
| glob.max_on_time | Maximum continuous tone time CTMAX (milliseconds) |
| glob.max_off_time | Maximum continuous silence time MAX SILENCE WAIT (milliseconds) |
| glob.on_glitch | Maximum "on" time deemed a glitch (milliseconds) |
| glob.off_glitch | Maximum "off" time deemed a glitch (milliseconds) |
| glob.burst_time | Time frame BURST SAMPLE TIME for counting tone messages during answer detection (milliseconds) |
| glob.max_burst_count | Number MAX COUNT PER BURST SAMPLE TIME of detected tone messages during BURST SAMPLE TIME to report answer |

INTERNATIONAL UNIVERSAL CALL PROGRESS ANALYSIS SYSTEM

CROSS-REFERENCE TO RELATED APPLICATION

The present application is a continuation-in-part of commonly assigned U.S. patent application Ser. No. 08/835,126, which was filed on Apr. 4, 1997, now abandoned, by Kevin C. Kicklighter for a UNIVERSAL CALL PROGRESS ANALYSIS SYSTEM and is hereby incorporated by reference.

BACKGROUND OF THE INVENTION

1. Field of the Invention

This invention is concerned with the field of telecommunications and with the detection and analysis of call progress signals generated by a telecommunications system, and, more particularly, with international call progress analysis.

2. Discussion of Related Art

Call progress analysis (CPA) involves the monitoring of a telecommunications channel for identifiable system-generated call progress signals which indicate the status of the call being monitored. Examples of such signals are dial tone, ringback, busy, and the like. These signals not only provide audio information to a user of the telephone line but, if properly monitored, allow steps to be taken toward connection of the call or one of various other appropriate actions.

CPA has been implemented in the past as part of a programmable telecommunications switch. Typically, these conventional digital telecommunications switches employ a time slot interchange (TSI) to effect switching using time division multiplexing (TDM) techniques. In addition to controlling the switching of calls, digital telecommunications switches are also usually required to provide communications or call processing services. Such services include tone generation and tone detection, but may also include more sophisticated services to meet the requirements of a particular application. A switch of this type is used in a system described by U.S. Pat. No. 5,349,579 entitled "TELECOMMUNICATIONS SWITCH WITH PROGRAMMABLE COMMUNICATIONS SERVICES." That patent is assigned to the assignee of the present invention, and is incorporated herein by reference.

In the past, call progress signals have been distinguished based on a minimum energy level present in one or more frequency bands, which energy had a particular cadence (i.e. how the signal energy alternates between being present and being absent). One example of such a system is demonstrated by European Patent Application EP 0 493 056 A2, submitted by Gupta, et al. (the "Gupta" system).

The Gupta system involves call progress analysis in which different signals are differentiated by the cadence patterns they follow. Different cadence patterns may be stored during setup of the system. The presence of sufficiently similar cadence patterns on the monitored telephone line allows the system to determine when certain call progress signals are present.

The Gupta system relies on combinational logic to verify that the signal energy on the monitored line is in the desired frequency bands. When the detected energy is in any one of the expected frequency bands, and when an expected cadence pattern is detected, the presence of the call progress signal having that cadence is confirmed. The Gupta system does not report all frequencies to all pattern detectors, only to those pattern detectors whose patterns contain these frequencies. The routing of frequencies to pattern detectors is static. This routing cannot be modified on a call-by-call basis. If the signal energy is in one of the expected frequency bands, the system confirms the presence of a call progress signal described by the detected cadence pattern, regardless of whether the signal contains the frequencies associated with that particular call progress signal. As such, a spurious signal having the cadence of one call progress signal, but the frequency content of another, could be confirmed by the Gupta system as being the call progress signal having that detected cadence pattern. In addition, it does not appear that Gupta provides the capability of customization by a user of the types of patterns that user desires in a plan. Gupta requires separate hardware for every defined plan, which could become costly and introduce space constraints on the card.

With the advent of localized telephone systems such as private branch exchanges (PBXs), the types of call progress signals are becoming more diversified. The larger number of different signals allows a system to perform a larger number of various operations. However, it also requires that a CPA system be able to distinguish the additional call progress signals.

One example of the problems confronting modern CPA is that different telecommunications systems use different call progress signals in different capacities. That is, a particular call status may be identified by one signal in a first PBX, and by a completely different signal in a second. A similar problem is prevalent with regard to the public telephone networks of different countries, many of which use vastly different call progress signals for the same functions. In either of these situations, no standard exists with regard to the use of call progress signals. Therefore, a conventional CPA system must either be custom built for the particular country or the particular PBX system for which it is intended, or must be versatile enough to accommodate different sets of call progress signals.

The programmability of the Gupta system allows a system to be set up for a particular designated environment. However, if that environment contains signals, which are too closely, related in cadence (while having a different frequency spectrum), the system will be unable to distinguish them. Also, the frequencies and tones in the Gupta system are not automatically customized by the definitions of the call progress patterns to be detected. A high accuracy CPA system would allow the discrimination of different signals, which were closely related in frequency or cadence, and would reduce the false alarm rate of detection. Such discrimination would be customized on a call-by-call basis. This would greatly increase the number of distinguishable call progress signals and, thus, provide more system versatility.

SUMMARY OF THE INVENTION

The present invention provides a call progress analysis system and method for use with a programmable telecommunications switch. The system is preferably completely generic in that all of the detection parameters may be configured for the specific application of any particular end user. The system includes a host, which communicates with a data processor on the switch. The data processor controls the operations of one or more digital signal processors (DSPs) which are used to monitor channels of the switch for call progress signals.

The data processor runs a main detection program which processes detected signal data and compares it to stored information that represents pre-defined call progress signals. Stored in a memory unit is at least one group of tone descriptors that define different expected tones. Each tone descriptor defines a tone by the presence of particular frequencies at a minimum threshold energy level. For a particular end user who needs to detect a particular set of call progress signals, the tone descriptors may be configured by storing parameters which describe the frequencies and relative energy levels which are associated with the those signals. Also stored in memory is at least one set of pattern descriptors which reference the tone descriptors, and which define different expected cadence patterns. Like the tone descriptors, these pattern descriptors are configured for the particular telecommunications system being serviced by setting the parameters of the pattern descriptors such that they describe those call progress signals which the system user is likely to encounter.

In response to a message to perform CPA, the processor dynamically instructs an assigned DSP to begin monitoring a particular channel. The DSP functions as a signal detector and returns information to the processor. In the preferred embodiment, the DSP has access to the tone descriptors and, upon comparing the detected frequencies to the tone descriptors, assembles a message indicative of individual frequencies that are present in the detected signal. A new message is assembled and sent by the DSP to the processor each time there is a significant change in the detected signal. The DSP also includes in each message an indication of the elapsed time since the last message was sent. Thus, a new time interval starts with each significant change in the frequency content of the detected signal. The processor assembles the tones that are sets of frequencies, which are indicated by the DSP message as being present for a given interval. The processor then attempts to match the tones and the duration of the interval to one of the pattern descriptors stored in memory.

The adaptability of the invention to different telecommunications systems having different call progress signals is provided in a number of ways.

In accordance with one aspect of the invention, the frequencies and tones detected by the switch can be customized. The frequencies are combined to create call progress tones, which are then combined during sequential intervals of time to form call progress patterns. In addition, a frequency mask is computed that is specific to a pre-defined call progress analysis ("CPA") class. A CPA class is defined as a user-customizable set of certain prescribed patterns, such as a busy pattern, or a dial pattern. This frequency mask is used to cause the DSP receiver to substantially ignore frequencies that are not part of any CP pattern in a CPA class of interest. Accordingly, the DSP performs frequency detection that is customized to each channel, which in turn reduces the false alarm rate of the detection.

In accordance with yet another embodiment of this invention the parameter values which define each of the pattern descriptors, as well as the parameter values which define each of the tone descriptors. Since each pattern descriptor references at least one tone, finding a pattern, which matches the detected signal, requires matching both the cadence and the tone(s) of the call progress signal it defines. By specifying appropriate tone and cadence parameters, a set of customized call progress signals to be detected by the system is created.

Once the system is configured and put into operation, CPA may be invoked at any time by the host or by any other call processing task of the system. For simplicity, the following description refers to the host as being the source of the request. Once instructed to begin performing CPA, an assigned DSP begins reporting individual frequencies that identify the tones detected on the monitored channel. With the first message received, the processor begins comparing the detected tones (sets of frequencies) to those defined in the pattern descriptors. However, it waits for the first complete tone before doing any interval matching. That is, the processor waits for the first detected occurrence of silence on the channel before trying to match the duration of an interval with the interval duration parameters of the pattern descriptors. However, since the first tone message received may define a continuous tone (such as a dial tone), the tone message is compared to those pattern descriptors that describe a continuous tone. If the tone parameters match and the duration of the first tone message is long enough, the detected signal may be identified as a continuous tone.

After the first interval (i.e. upon receipt of the second frequency message) the processor proceeds to a "Not-determined" phase, and begins matching the detected parameters to the parameters of the stored pattern descriptors. A possibility list is created of patterns which match with the first interval parameters of tone and interval duration. For each pattern descriptor, the processor keeps track of how many intervals have been successfully matched for that pattern, as new patterns may be introduced to the possibility list during subsequent intervals. Patterns, which no longer match during subsequent intervals, are removed from the possibility list.

The preliminary identification of a matching pattern descriptor is made based on the number of successive intervals matched by a particular pattern. The number of successive intervals, which might be required for a particular pattern, may be configured as part of the defining pattern descriptor. As soon as that pattern has matched the required number of intervals to be declared a probable match, the other patterns are removed from the possibility list and the processor advances to a "Determined phase."

The Determined phase allows continued verification of the apparent matching pattern descriptor found during the Not-determined phase. The length of the Determined phase depends on another parameter specified for each pattern, which requires the matching process to successfully continue for a certain number of additional intervals. In the event that subsequent intervals do not match with the previously-matched pattern, the program may enter an optional "Post-determined" phase. Whether a matched pattern may proceed to the Post-determined phase depends upon another configurable parameter of the pattern descriptor.

In the Post-determined phase, the possibility list is reinitialized to include all patterns having a "Accept After Determined" flag set. The matching process then continues until a match is found, until all possibilities are eliminated, or until a timer having a configurable time-out value expires. In the latter two cases, the failure to match one of the patterns is reported to the host.

In addition to the above, certain maximum time limits for the Determined and Not-determined phases may be configured to ensure the termination of the matching function after some predetermined time. Parameters may also be specified which provide an initial start-up delay, or which prevent the processor from waiting during an extended period of silence on the channel. Configurable glitch logic may also be provided which intervenes between the DSP detection messages and the processor to filter out signals and silences which are exceedingly short in duration.

An optional Answer Detection function is also configurable, which allows the specification of the maximum number of new tone messages during a particular period of time. This function, when active, is invoked once for every new tone message. Since a human voice answering a call generates a number of different frequency changes over a relatively short period of time, it creates a quick sequence of tone messages. The Answer Detection function therefore allows an "answer" to be declared more quickly than would otherwise occur in the normal course of the main detection program.

In accordance with another aspect of this invention, the described frequency mask can also be used to perform call progress analysis using a DSP receiver that functions as an energy detector rather than a frequency discriminator. In this case, the DSP detects the presence or absence of energy on the channel, and this information is reported to the processor. The processor then uses the frequency mask during intervals in which energy is present, and then applies the same tone and pattern matching logic described previously. An advantage of this scheme is that an energy detector can have a simpler implementation than a frequency discriminator, which can allow the DSP to provide more channels of energy detection than frequency discrimination. This allows the telecommunications switch to provide an optional implementation of call progress analysis using energy detection, which presents a lower-cost, higher-density option to the customer. Another advantage of this scheme is that the same tone and pattern matching logic can be used with a frequency discriminator or an energy detector, thus insuring consistent behavior between frequency-discrimination and energy-detection modes, and also simplifying the databases of classes, patterns, and tones that are needed.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 2, is a list of configurable parameters which make up a pattern descriptor of the present invention;

FIG. 3, is a list of configurable parameters which make up a tone descriptor of the present invention;

FIG. 3A, is a schematic representation of a typical tone message issued by a DSP in accordance with the present invention;

FIG. 12 is a list of configurable global parameters used by a method of the present invention;

DETAILED DESCRIPTION OF AN ILLUSTRATIVE EMBODIMENT

Figure 1:
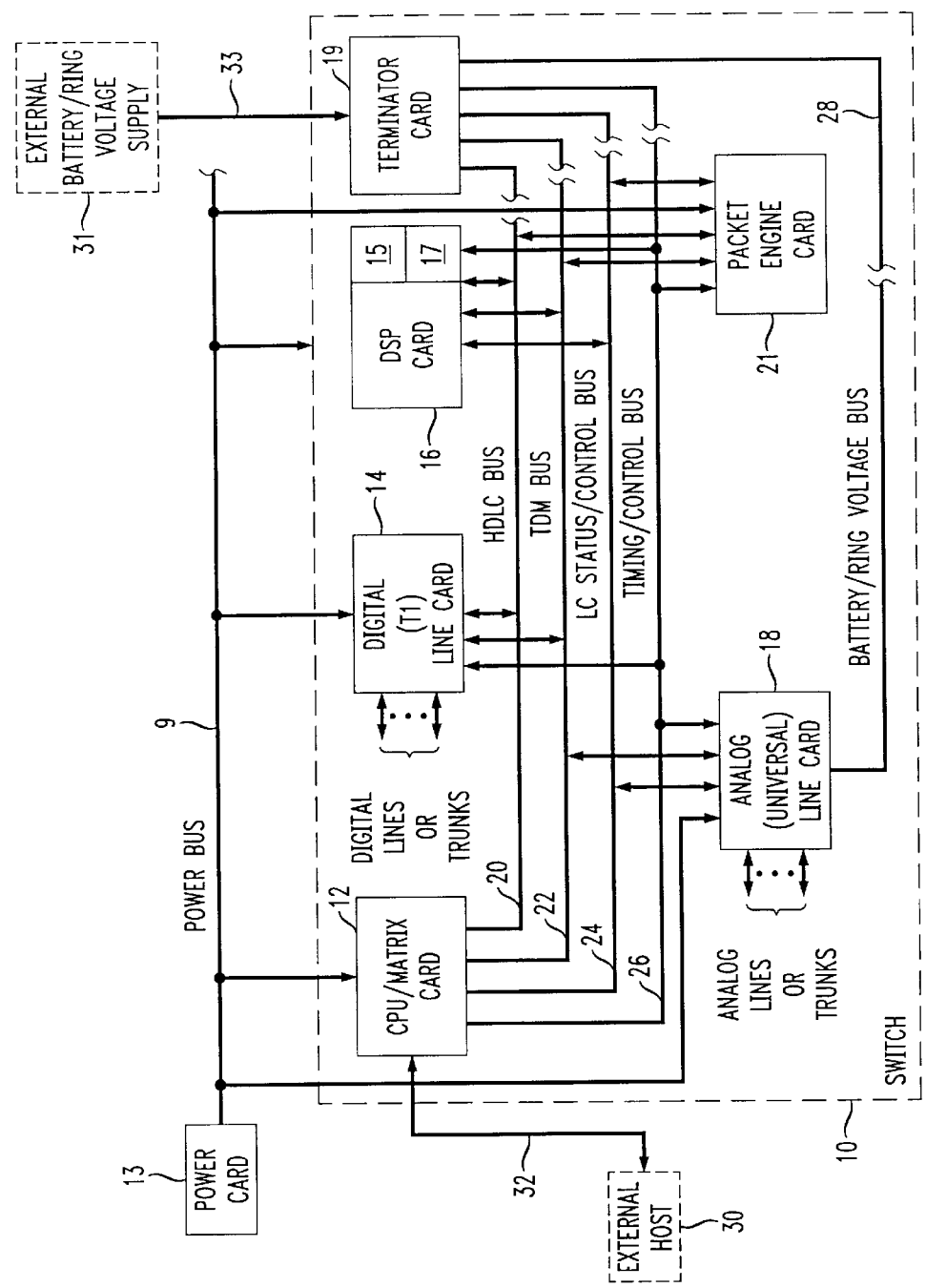
FIG. 1, is a block diagram of a programmable telecommunications switch for use in accordance with a preferred embodiment of the present invention.

Shown in FIG. 1 is an overview of a programmable telecommunications switch 10 which is suitable for supporting the present invention. This particular switch is housed in a personal computer. However, the invention may also be implemented on a switch which is housed individually. An example is a switch for which component cards of the switch are mounted on a passive backplane, which routes power to the system and provides the necessary signal busses. In addition, those skilled in the art will recognize that other call processing systems may also support the present invention.

The switch 10 includes a CPU/matrix card 12 which is inserted into one of the mounting slots of the switch and is thus connected to power bus 9. The CPU/matrix card 12 is interconnected with a digital (T1) line card 14, a digital signal processing (DSP) card 16, an analog (universal) line card 18, a terminator card 19 and a packet engine card 21 by four busses: a high speed data link control (HDLC) bus 20; a TDM bus 22; a line card (LC) status/control bus 24; and a timing/control bus 26. A battery/ring voltage bus 28 supplies battery voltage (48VDC) and ringing voltage (109VAC) to the analog line card 18. The terminator card 19 serves to physically terminate busses 20, 22, 24, 26 and 28.

The CPU/matrix card 12, line cards 14 and 18, the DSP card 16 and the packet engine card 21 are all connected to and receive their basic operating power from an external power bus 9 which, in this case, is connected to power card 13 via a passive backplane. Although only one digital line card 14 and one analog line card 18 are depicted, it should be understood that additional line cards of either type may be added subject to two physical limitations: (1) the maximum switching capacity of the CPU/matrix card 12, and (2) the physical space within the housing of the switch. Similarly, additional DSP cards 16 or packet engine cards 21 are typically included subject to physical space limitations.

An external host 30 (e.g. a personal computer, workstation or other computer) may be connected via a communication channel 32 to the CPU/matrix card 12. The CPU/matrix card 12 typically includes a conventional RS-232 compatible interface for connecting to the channel 32. The external host 30 preferably operates under an application-oriented operating system. An external battery/ring voltage supply 31 is connected via a path 33 to the terminator card 19. Supply 31 may comprise, for example, a commercially available power supply.

Two functions of the DSP card 16 are also depicted schematically in FIG. 1. Each of these functions is outside of the main detection program depicted in FIGS. 4–11. Glitch detection logic 15 (discussed hereinafter) serves to filter frequency signals detected by a digital signal processor of the DSP card which is assigned to service the CPA functions of the present invention. Gross energy detector 17 responds to broadband signals on a monitored channel which have a certain minimum energy level, and therefore are likely to be representative of a human voice answering a call. When a signal is detected having a selected minimum energy level across a broad frequency band, the gross energy detector reports an "answer" to the host 30, regardless of the state of the main detection program. Use of this energy detector allows an "answer" to be reported more quickly than it otherwise would using the main detection program.

The system of FIG. 1 is capable of supporting CPA functions. However, the manner in which the services are provided depends on the system construction. According to the present invention, a CPA system is configurable for and adaptable to a wide variety of telecommunications switches such as the switch shown in FIG. 1. The system implements a detection method which may be adapted to a variety of different telephone networks having different call progress signals. During system setup, user-specific parameter values are used to define a set of detectable tones and a set of detectable cadence patterns. During CPA, a detection program is executed which utilizes the designated parameter values, and thus only detects call progress signals as defined for the particular end user.

The detection method performed by the system is demonstrated by the flow charts of FIGS. 4–11. This method is implemented using known programming techniques, and is described in detail hereinafter.

Referring to FIG. 1, each DSP card 16 of the switch 10 preferably includes a master processor and a plurality of digital signal processors (DSPs). In the preferred embodiment, the master processor is a Model 68302 microprocessor manufactured by Motorola, Inc. The master processor controls the DSPs on its card and responds to messages which are forwarded on an HDLC bus 20 by the CPU/Matrix card 12. When call progress analysis is required on a particular channel, a message is issued to the master processor which includes an instruction set for beginning call progress analysis. That message may come from the host 30 or from any task on the system which controls call processing, and is forwarded by the CPU/Matrix card 12 to the master processor of the DSP card 16 selected for the task. For clarity, the following description refers to the host as being the source of the request. However, those skilled in the art will recognize that this request can come from other sources.

The CPU/Matrix card 12, by sending appropriate messages to the DSP card 16, assigns a DSP to do the frequency detection on the channel in question. The master processor receives the message and responds by starting a main detection program called "Tone Control" which, for simplicity, will be referred to hereinafter as "TC." Much of the body of this description refers to "actions" taken by TC. It will be understood by those skilled in the art that such descriptions, in actuality, refer to tasks or subtasks which are initiated by TC.

Once assigned by the CPU/Matrix card to perform CPA with respect to a particular channel, the DSP begins monitoring that channel and senses the signal strength at each of a plurality of different predetermined frequencies. The DSP has access to configured tone descriptors (described below) and frequency masks which define tones of interest by the frequencies and the minimum energy threshold required for each frequency. By detecting the energy level of the signal on the monitored channel at the different frequencies of interest and comparing to the frequency mask, the DSP thereby determines which frequencies are present in the detected signal. The DSP transmits a message to the master processor that indicates which frequencies are present. The message consists of a sequence of bits, each bit corresponding to one of the frequencies described by the tone descriptors. For a particular frequency, the corresponding bit in the DSP's message is set to a logic "1" if the energy level of the signal at each frequency defined in the tone descriptor is above a predetermined threshold defined for that frequency.

Each time the frequency information detected by the DSP changes (i.e. changes significantly enough to change the tones being reported), TC detects the new frequency message. Because most call progress analysis signals are repeating in nature, it is expected that such changes in the reported frequencies will occur. TC, in effect, takes the change in the DSP message as being a new time segment of a changing signal pattern. The change might be from the presence of expected frequencies to their absence (i.e. silence, which is identifiable by all frequency bits being set to a logic "0"), from silence to the presence of frequencies, or from one set of expected frequencies to another. Each of these successive time periods is referred to as an "interval." When the frequency message from the DSP changes, TC determines that a new interval has begun.

In addition to receiving the frequency information from the DSP, TC also receives the duration of the interval, which has just ended. The interval duration may be expressed in any time units convenient to the operating environment (e.g. clock cycles of the master processor). The interval duration is compared to ranges which are used to identify different possible call progress signals, as discussed in more detail below.

The detection of specific call progress signals is accomplished by comparing, interval by interval, the frequency information and the interval duration information of the detected signal to the parameters of the configured pattern descriptors.

FIG. 2 shows a preferred collection of configurable parameters which may be used in the preferred embodiment to define desired pattern descriptors which represent call progress signals. The parameters listed in FIG. 2 collectively make up a single pattern descriptor, as used in the preferred embodiment. By specifying a value for each of the parameters listed, one call progress signal to be detected may be completely defined. This process of defining a signal is repeated for as many descriptors as are desired. "Classes" of descriptors may also be defined, each class designating a plurality of defined descriptors (non-exclusively) which can then be searched together as a group. The parameters are organized for use with an object-oriented programming environment.

The following is a brief description of the parameters of each pattern descriptor, as shown in FIG. 2. Most of these are discussed in further detail in later sections.

"PATTERN ID" is a numeric identifier of the pattern descriptor, each descriptor having a unique ID which allows them to be referenced easily by TC.

"TONE GROUP ID" is a list of the tone groups with which the pattern descriptor is associated. Because the preferred embodiment is an object-oriented programming environment, it is desirable to organize into groups those tone descriptors which are associated with one another. For example, all of the tones which are used in call progress signals in the North American public telephone network might make up a single tone group. For a user who made frequent overseas calls, it might also be desirable to create another tone group consisting of those tones used in call progress signals for the overseas location most frequently called. In the preferred embodiment, each DSP services only one tone group. Therefore, depending on which tone group is appropriate for the call progress task at hand, a different DSP may be assigned. Since a particular pattern descriptor might be used for different tone groups, specifying the tone groups for each pattern descriptor allows TC to test only those pattern descriptors which designate the tone group of interest.

"MODE BITS" is a sequence of digital logic flags which are available to designate different characteristics of the pattern descriptor which are used by TC. These are discussed in more detail below in the context of the TC flow logic.

"REPORT ON CYCLE LOST" is a field in which the representation of a message to be reported to the host may be placed for the pattern descriptor. This message is one which is to be reported to the host in the case that the "determined" pattern descriptor fails to continue matching a required number of subsequent intervals after TC has proceeded to the Determined phase. For some pattern descriptors it may be desirable to just report the PATTERN ID to the host, thereby confirming the matching of that descriptor nonetheless. However, it may also be desirable to simply report an error message. Thus, depending on which pattern descriptor is being tested, a different message may be reported in the case of an error, as discussed hereinafter.

"CYCLES TO VALIDATE" is a parameter used during the Not-determined Phase of TC which specifies the number of cycles for which the pattern descriptor must match a detected signal before it is validated as a probable match. The determination of a probable match for a particular pattern descriptor is dependent on the number of sequential intervals for which it matches the detected signal. The period over which a pattern descriptor must continue to match the detected signal may be individually specified for each of the pattern descriptors. The preferred embodiment uses the term "cycle" to refer to the period over which a signal is non-repeating (e.g. for a "busy" signal, an "on" interval followed by an "off" interval).

"MIN CYCLES TO REPORT" is a parameter which specifies a minimum number of cycles typically required before the pattern descriptor is reported to the host by TC as being the matching pattern descriptor (subject to a possible report of the pattern descriptor from the field "REPORT ON CYCLE LOST).

"INTERVAL COUNT" is parameter which specifies the number of intervals which are used to define the pattern descriptor.

For describing each interval, the pattern descriptor is configured with three parameters: the ID of the tone present during the interval; and the minimum and maximum limits for the duration of the interval. It will be understood by those skilled in the art that a "tone" may actually be a combination of different frequencies. The preferred information stored by a user to define each tone is shown in FIG. 3, and is discussed in more detail hereinafter.

FIG. 2 shows an indefinite number of specified intervals (to the nth interval) and, in fact, a different number of intervals may be specified for each pattern descriptor, thus accommodating any type of call progress signal. Each pattern descriptor identifies the tones which are present in a particular interval by a "TONE ID." The "TONE ID" of the tone descriptor (which describes the tone present in the interval) is stored in the field "FREQ_INTS[n].TONEID." The minimum duration of the interval is specified by a value stored in the field "FREQ_INTS[n].MIN." Similarly, the maximum duration of the descriptor interval is specified by a value stored in the field "FREQ_INTS[n].MAX."

A user may specify as many of these intervals for the pattern descriptor as desired but, typically, it is only desirable to define as many intervals as make up a complete, non-repeating portion of a repeating signal. For example, with a signal such as a "busy" signal, the first interval (having a tone) would be specified along with the second interval (where the "tone" is actually silence). However, after these first two intervals, the signal begins to repeat, and specification of additional intervals is not necessary.

Another reason why it is not necessary to specify more than the initial non-repeating intervals of a pattern descriptor is that for each new interval, TC compares the new information with every pattern descriptor, regardless of whether the information acquired during previous intervals matched that of a particular interval. For each pattern descriptor, TC keeps track of how many successive intervals have been matched for that descriptor. Thus, there may be one descriptor which has matched the previous three intervals, while another has matched only the latest interval. Both of those descriptors remain candidates for a possible matched with the detected signal. In fact, a descriptor which does not match for one or two initial intervals may match later intervals, and eventually be confirmed as the match for the detected signal.

FIG. 3 lists parameters for which values may be defined during configuration of the system to create each of a list of different desired tone descriptors. The tone descriptors are used by the DSP to create the tone message that is delivered to the master processor from the detected signal. Each tone descriptor in the preferred embodiment, as shown in FIG. 3, includes the following parameters.

"TONE ID," is discussed above, and is a value by which the master processor and the pattern descriptors can uniquely identify that particular tone descriptor.

"FREQ.CNT" is a value specifying the number of frequencies which make up the tone.

The remainder of the tone descriptor is information which describes the frequency components of the tone. For each frequency component of the tone, two parameters are provided to define that component. Those parameters are the frequency (in Hertz) which is stored in the field "FREQ_DBM[n].FREQUENCY," and the minimum energy level of that frequency (in dBm) which is stored in the field "FREQ_DBM[n].DBM" (where n is a value which distinguishes one frequency from other frequencies of that tone descriptor).

When the DSP detects a signal on a given channel and responsively generates a message which is transmitted to TC, the message contains a bit corresponding to each frequency descriptor. The structure of the frequency message is depicted schematically in FIG. 3A. The frequency bits 50 each correspond to a different frequency, and the duration portion 52 of the message contains a digital representation of the duration of the most recently completed interval. If the detected signal contains a frequency at an energy level which exceeds the specified minimum level, the bit 50 in the DSP message which corresponds to that particular frequency is set to a logic "1". If the frequency is not present in the detected signal with at least the minimum specified energy, then the bit of the frequency message corresponding to that frequency is set to a logic "0". It will be understood by those skilled in the art that the number of bits shown in FIG. 3A is for illustration only, and that any number of tone bits may be included in the message (as required by the particular number of tone descriptors configured for the system).

Initial Phase

Figure 4:
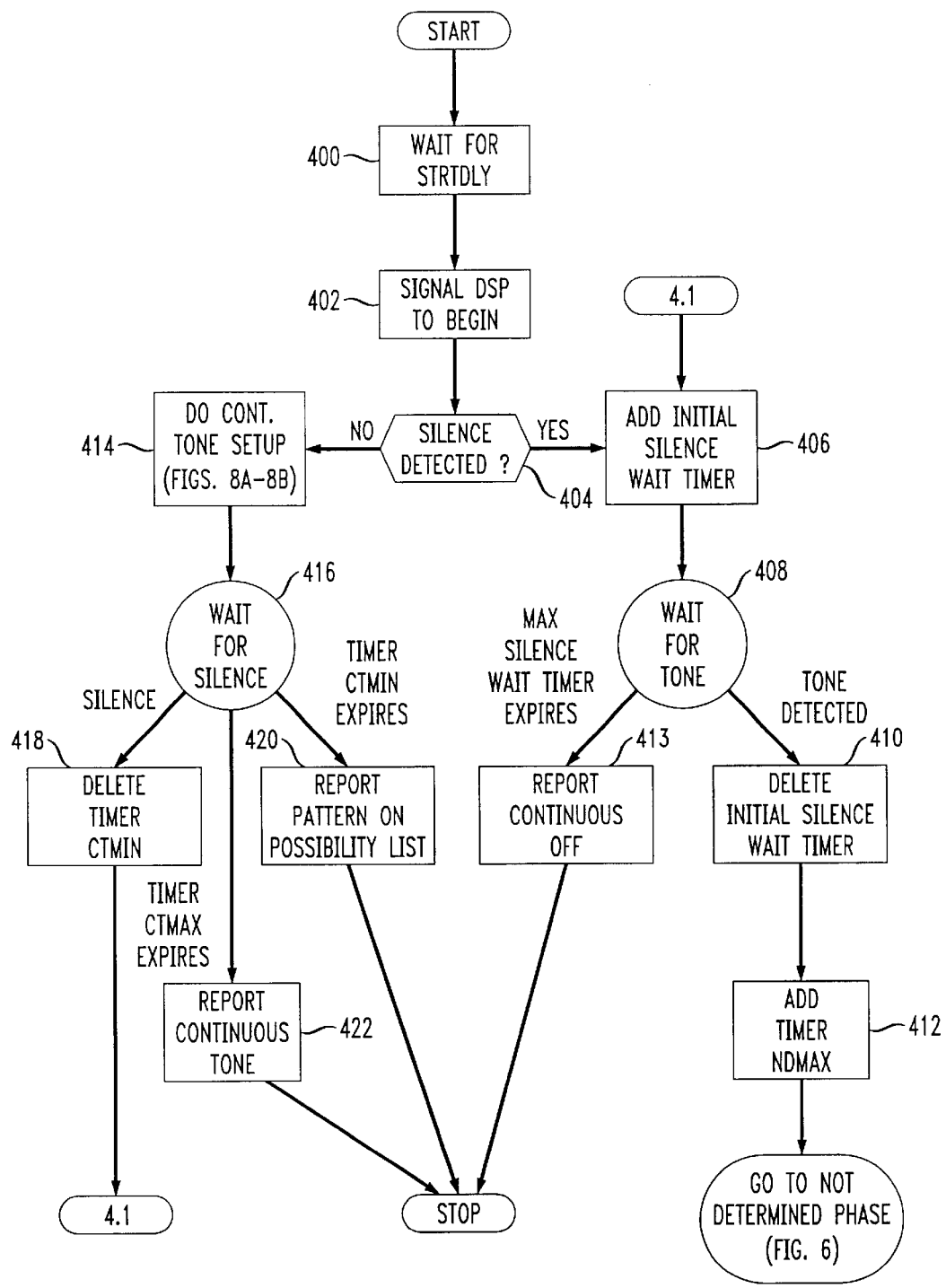
FIG. 4, is a flow diagram of an "Initial" phase of a detection method of the present invention.
Figure 5:
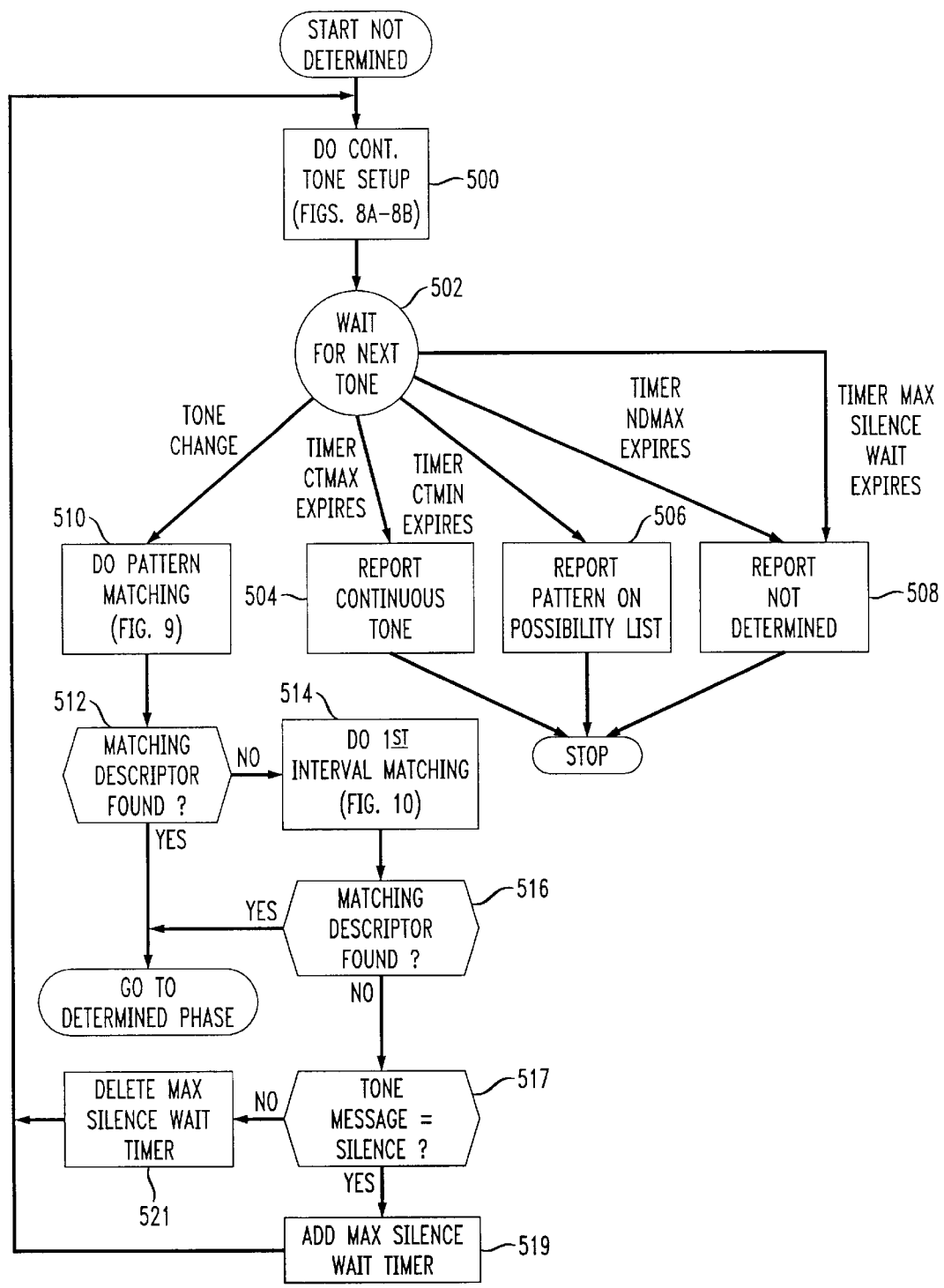
FIG. 5, is a flow diagram of a "Not-determined" phase of a method of the present invention.

Once the appropriate tone descriptors and pattern descriptors are defined for the system, they are available to be called and used by TC in the manner set forth in FIGS. 4–11. With reference now to FIGS. 1 and 4, TC, after receiving a forwarded message from the host 30 requesting CPA on a designated channel, waits for the predefined wait period STRTDLY in step 400. STRTDLY is a configurable parameter discussed hereinafter, which allows the start of the main program to be delayed. Such a delay may be desirable since the channel may be noisy in the initial stages of connection. After STRTDLY, TC signals the DSP to begin doing signal detection in step 402. TC then advances to decision block 404 at which time the first frequency message is examined to determine whether silence (i.e. a message indicating that the frequency equals zero) is being detected. If so, TC proceeds to step 406, where an initial silence wait timer is started. INITIAL SILENCE WAIT is a configurable value and establishes how long TC will wait while only silence is detected on a particular channel. Once this timer is started, TC proceeds to a wait state at step 408 and waits for the presence of a first tone (i.e. non-silence).

Either of two occurrences causes TC to progress from the wait state 408. If frequencies are detected and reported in a frequency message from the DSP, TC deletes the initial silence wait timer at step 410, adds timer NDMAX at step 412 and proceeds to the Not-determined phase. The duration of NDMAX is configurable, and puts a limit on the amount of time which TC may remain in the Not-determined phase.

If, while in wait state 408, the initial silence wait timer expires before any frequencies are detected, a "continuous off" is reported in a message to the host at step 413. This output indicates that there is only silence on the line. After reporting a continuous off, TC is halted.

If non-silence (i.e. frequencies) is detected at step 404 of FIG. 4, TC proceeds to step 414, where a continuous tone setup function is called. The purpose of this function is to help establish whether a detectable continuous tone is present on the channel. The flowchart of FIGS. 8A and 8B show the details of this function.

Figure 8A:
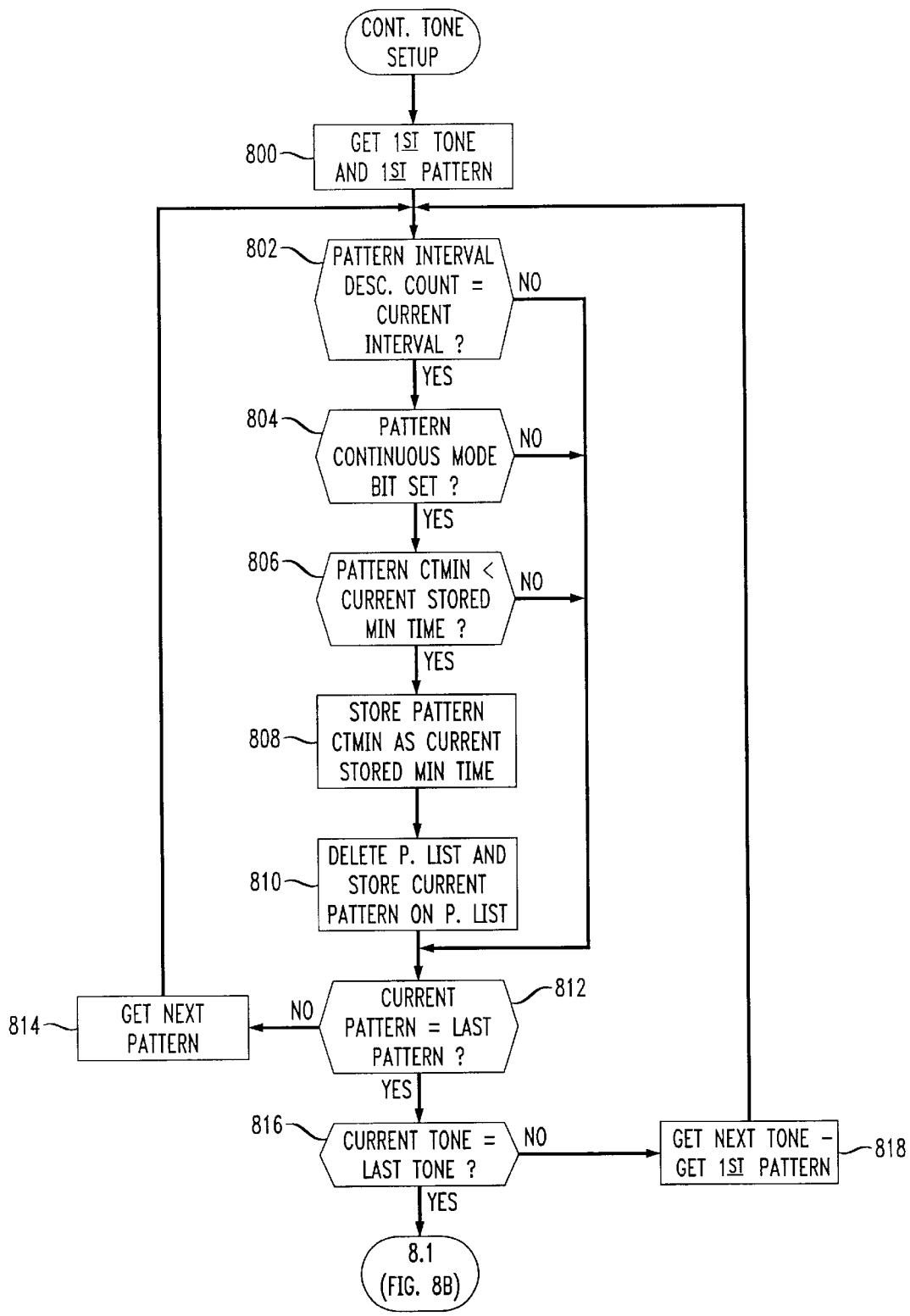
FIGS. 8A, and 8B are a flow diagram of a "Continuous Tone Setup" function of a method of the present invention.
Figure 8B:
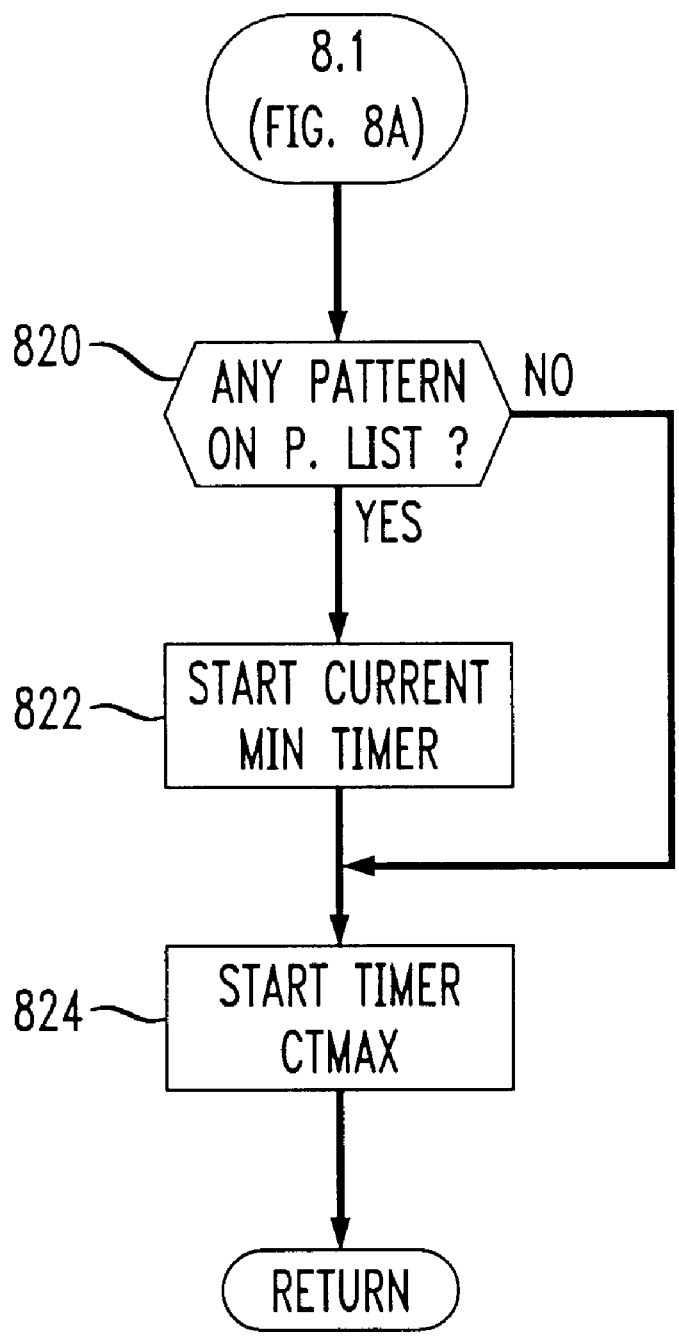
Figure 9:
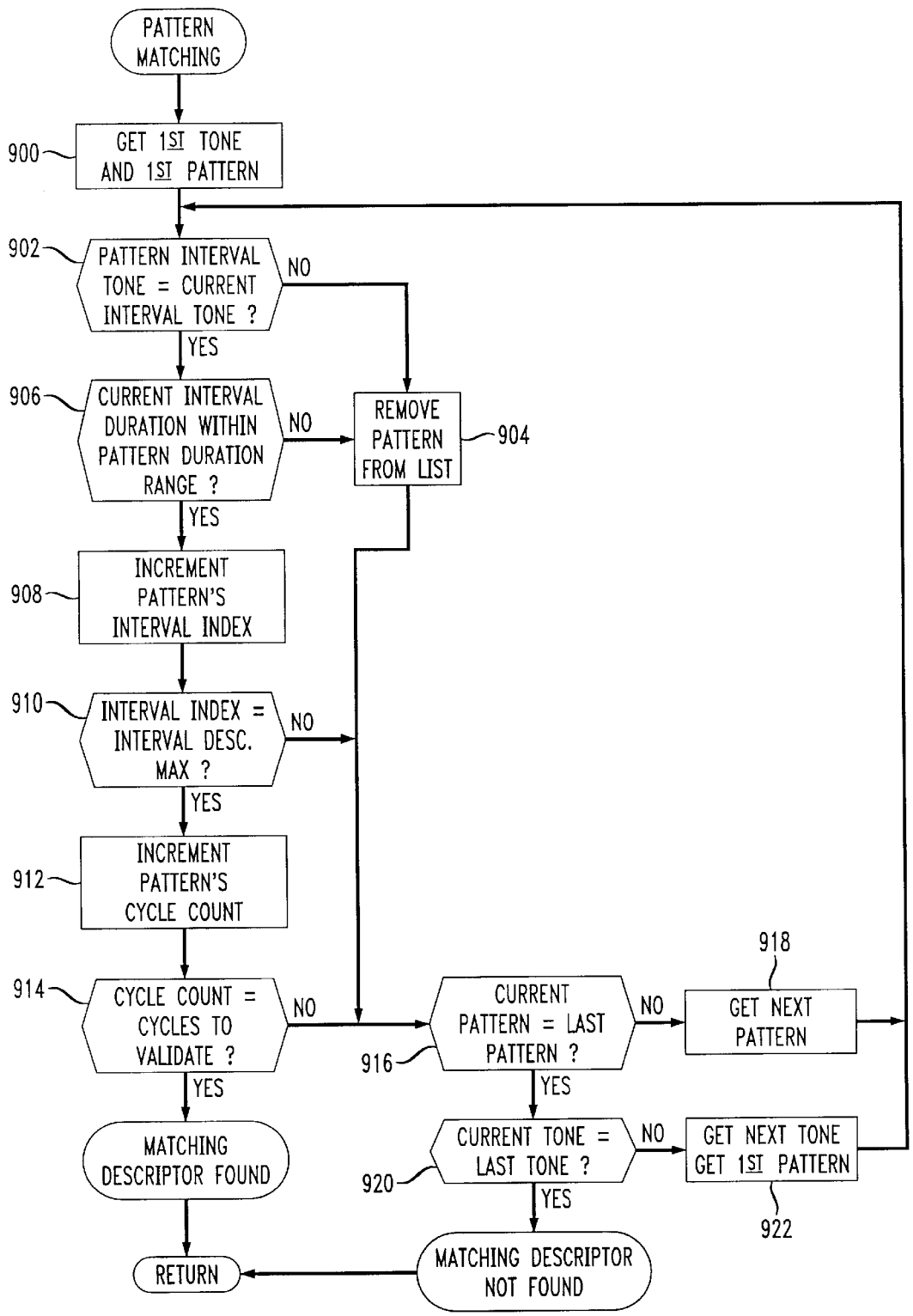
FIG. 9 is a flow diagram of a "Pattern Matching" function of a method of the present invention.

Referring to FIG. 8A, the continuous tone setup function is a loop which compares each pattern descriptor stored in the system with each tone reported in the last message from the DSP. The loop begins by TC accessing the first tone bit and the first pattern descriptor at step 800. At step 802, the pattern is tested to determine whether its interval count (INTERVAL COUNT) is equal to the current interval of the detected signal.

As mentioned above, INTERVAL COUNT is a configurable parameter of each pattern descriptor which designates how many intervals are used to describe the call progress signal it defines. For example, a dial tone would be described by only a single interval since it is just one continuous tone, while a busy signal would be described by two intervals (which repeat), those being the on period and the off period of the signal. Because a continuous tone would necessarily only be present when the interval of the detected signal was equal to the interval count of the pattern descriptor describing that tone (a continuous tone must be the last interval of a signal), a failure to match these values in step 802 results in the other testing steps being bypassed, and TC proceeding to step 812.

If the interval count of the current pattern matches the interval of the detected signal, TC proceeds to step 804, where the pattern descriptor is tested to determine whether the "continuous" mode bit is set to a logic "1". The mode bits of each pattern descriptor provide information regarding that pattern. The "continuous" mode bit of a given pattern descriptor is set to "1" if that descriptor includes a continuous tone. Thus, if that bit is not set to "1" in the current pattern descriptor, steps 806–810 are bypassed and TC proceeds directly to step 812.

If the continuous mode bit is set to "1", then the minimum duration value of the continuous tone of the descriptor is tested in step 806 to determine whether it is shorter than the duration specified by variable "CTMIN." CTMIN is a variable which is created by TC during the continuous tone setup to keep track of the shortest duration value of those pattern descriptors which satisfy steps 802 and 804, and which are thereby candidates for matching the current, (potentially) continuous tone. CTMIN is initialized to some value higher than any possible value specified in the pattern descriptors, thereby ensuring that the first of the descriptors for which TC reaches step 806 will have its minimum duration value stored in CTMIN.

The test in step 806 compares the minimum continuous tone time of the current pattern descriptor to that stored in CTMIN for a previous descriptor. If the current descriptor has a shorter minimum continuous time then that stored in CTMIN, that time is stored as the new value for CTMIN in step 808. Thereafter, in step 810, the new pattern descriptor is substituted for whatever descriptor may be currently on the list of possible matching descriptors which is maintained by TC. In this way, TC ensures that, if more than one descriptor matches the current continuous tone information, only the one with the shortest minimum continuous tone duration time is tested. If a subsequent descriptor has a continuous tone minimum duration which is longer than that stored in CTMIN, control goes directly from step 806 to step 812, bypassing steps 808 and 810.

Step 812 is part of the loop which steps the continuous tone setup function through each of the patterns for each of the tones. In step 812, the pattern is tested to see if it is the last pattern being checked and, if not, TC accesses the next pattern descriptor in step 814 and returns to step 802. If the current pattern descriptor is the last descriptor to be checked, control goes from step 812 to decision step 816, where TC checks whether all tones have been tested. If not, the next tone bit is accessed in step 818 along with the first of the pattern descriptors.

Once all of the pattern descriptors have been checked for all of the tone bits, control passes from step 816 to step 820 (FIG. 8B). At step 820, the possibility list is checked to see if there are any pattern descriptors on it. If so, timer CTMIN (stored from the parameters of the descriptor on the list, as described above) is started in step 822. This step is bypassed if there are no patterns on the list. Timer CTMAX is then started at step 824. CTMAX is a configurable, global system parameter which is used to limit the amount of time which TC will wait while there is a continuous tone on the channel which is not matched. Once this timer is started, the continuous tone setup function is complete, and control returns to the logic of FIG. 4. Following the continuous tone setup function, TC enters a wait state at step 416. At this point in time, TC is waiting for a period of silence which would indicate that the current interval of the detected signal is not a continuous tone. If silence is detected, prior to either of the timers CTMIN or CTMAX expiring, timer CTMIN is deleted in step 418, and control goes to step 406. If, prior to silence being detected or timer CTMAX expiring, timer CTMIN expires, the pattern on the possibility list is reported at step 420, and TC is halted. If the first of the three events is the expiration of timer CTMAX, a continuous tone is reported in a message to the host at step 422 without a pattern designation, and TC is halted. Thus, the message would indicate that the tone was continuous, but unidentifiable.

Not-Determined Phase

The two output branches from the decision block in step 404 allow TC to ensure that the first tone that is analyzed is detected for its entire duration. If silence is detected, then TC simply waits for the first tone and then proceeds to the Not-determined phase. If a tone is detected immediately, a continuous tone analysis is done followed by a wait for silence. If and when silence is detected, TC can then proceed to the wait state of step 408. This avoids any possible error from the detection of tones for less than their full duration.

Once TC has proceeded to the Not-determined phase (FIG. 5), the continuous tone setup function is executed at step 500. If silence was detected first by TC in step 404, then the continuous tone setup of step 414 is not encountered. Therefore, the function is present in step 500.

After the continuous tone setup, TC proceeds to the wait state of step 502, where it waits for the next tone. Because the continuous tone function results in the starting of timer CTMAX and, if there is a pattern placed on the possibility list, the starting of CTMIN, the expiration of either of these timers is possible from the wait state of step 502. As in the initial state, the expiration of CTMAX results in the reporting of "continuous tone" in step 504, and the expiration of CTMIN results in the reporting of whatever pattern descriptor is on the possibility list in step 506. After expiration of either CTMIN or CTMAX, TC is halted.

Another timer which may expire during wait state 502 is timer MAX SILENCE WAIT. This timer has a value which a globally configurable parameter (see FIG. 12 and discussion thereof) and limits the amount of time which TC will wait while only silence is detected on the channel. Because this timer value is typically much shorter than NDMAX, it allows a quick determination of when the channel has gone "dead". This is made possible by the knowledge of the longest possible silence period for any particular call progress signal (which is considerably shorter than NDMAX). The starting and deleting of this timer is performed after each pass of the matching function described below. If timer MAX SILENCE WAIT expires while in wait state 502, "Not Determined" is reported at step 508, and TC is halted.

It is also possible that timer NDMAX will expire during this wait state. NDMAX is started when TC proceeds to the Not-determined phase, and represents an upper limit on how long it will remain in the Not-determined phase. Because the pattern matching function (discussed below) could otherwise potentially require TC to remain in the Not-determined phase indefinitely, NDMAX provides an upper limit on the duration of the Not-determined phase. Timer value NDMAX is a global parameter which is configurable to a user's desired specification. If timer NDMAX expires while in wait state 502, the message "not determined" is reported back to the host in step 508, and TC is halted. This message indicates to the host that a signal was detected but that no matching pattern descriptor was found.

If a new tone message (i.e. a tone change) is received while in wait state 502, a pattern matching function is executed in step 510. That function compares the detected tones to the stored pattern descriptors in an attempt to identify the call progress signal. This matching function is shown in detail in FIG. 9.

Like the continuous tone setup function, the pattern matching function tests each of the pattern descriptors for each of the detected tones. This test begins by loading the first tone and the first pattern descriptor in step 900. For each of the patterns tested, TC maintains an interval index which is incremented each time that pattern is tested and successfully matched. Since the pattern descriptors may be tested for several intervals, this allows TC to match the correct interval of the pattern to the detected interval of the signal. Thus, in step 902 TC checks the interval of the pattern under test (i.e. that interval identified by the interval index for that pattern) to determine whether it matches the current interval of the detected signal with regard to the presence of the current tone under test.

In the preferred embodiment, during matching, the interval index lags by one behind the actual sequential value of the interval being tested. That is, for the first detected interval, the interval index is set to zero, and TC looks to the first interval of the pattern descriptor. If that interval is matched, then the interval index is incremented. For the next detected interval, TC sees that the interval index for that pattern descriptor is set to one, and compares the current detected interval information to the second interval of the pattern descriptor.

The specific matching function of the preferred embodiment involves matching each bit of the tone message, one bit at a time, to the interval of each pattern descriptor on the possibility list as identified by its interval index. In step 900, only the first tone bit of the DSP message is retrieved. So, for example, if that bit is set to a logic "1", each pattern descriptor on the list is then examined to determine if that tone is present in the interval of the pattern descriptor identified by its interval index. If that tone is not present, the pattern is removed from the possibility list.

The initial assignment of pattern descriptors to the possibility list occurs during step 514 (FIG. 5) in which the function "1st interval matching" is executed. Thus, the first time the pattern matching function is executed, there are no matches since no pattern descriptors have yet been assigned to the possibility list. However, since the pattern matching is repeated for each tone message, the following description of the pattern matching function assumes that pattern descriptors are already present on the possibility list. A detailed description of the 1st interval matching function is provided further below.

Referring again to FIG. 9, the comparison of the current detected tone to the indexed interval of the pattern under test occurs in step 902. If the tone is not part of the indexed interval, then the pattern under test is removed from the possibility list in step 904, and steps 906–914 are bypassed. If the tone is matched, the duration of the tone is then tested in step 906.

Since the duration of the "current" set of tones under test must be tested, TC actually tests the tones from the previous interval. That is, with each new message from the DSP, TC receives the duration of the interval just having ended. It can then match both the tone and duration of the detected signal against each of the pattern descriptors. Therefore, in actuality, the "current" interval under test is the last completed interval of the detected signal, and TC has the information necessary to match the duration of the detected signal interval against the duration ranges provided by the pattern descriptors in step 906.

If the duration of the detected tone does not fall within the range of durations provided in the indexed interval of the pattern under test, the pattern descriptor is removed from the possibility list in step 904, and steps 908–914 are bypassed. If the duration does match that of the pattern descriptor, the interval index for the pattern under test is incremented at step 908. The interval index is then checked against the value "INTERVAL DESCRIPTOR MAX", which is configurable for each pattern descriptor. This value specifies the number of intervals which are considered to make up one cycle of the pattern. For example, an on/off repeating signal, such as "busy" this value would typically be two, since only two intervals are required to describe it.

If the interval index has reached the INTERVAL DESCRIPTOR MAX for the pattern under test, the "cycle count" for the pattern descriptor is incremented in step 912 to indicate that a cycle has been completed. The cycle count is a variable which is maintained by TC for each of the pattern descriptors. It is similar to the interval index, but tracks the number of cycles which have been successfully matched, as opposed to the number of intervals. If the interval index has not reached INTERVAL DESCRIPTOR MAX, the incrementing of step 912 is bypassed. If the cycle count is incremented in step 912, the new cycle count is tested in step 914 against the value "CYCLES TO VALIDATE" for the pattern descriptor under test. CYCLES TO VALIDATE is a configurable parameter for each of the pattern descriptors which specifies the number of sequential cycles which must be matched for that pattern descriptor before that pattern can be declared the matching pattern.

If the new cycle count matches CYCLES TO VALIDATE, the matching function is terminated, and control is returned to the Not-determined phase with the matching pattern descriptor is found. If the number of cycles is still insufficient, the pattern is checked in step 916 to determine whether it is the last on the list to be tested for the current tone. If not, the next pattern is accessed in step 918, and control returned to step 902. If it is the last pattern, TC checks, in step 920, to determine if the tone being examined is the last tone. If it is not, then the next tone is retrieved in step 922, along with the first pattern on the list, and control is returned to step 902. If it is the last tone, then all of the patterns have been checked for all the tones, and control is returned to step 512 of the Not-determined phase with no matching pattern descriptor having been found.

In step 512, TC proceeds to the Determined phase if a matching pattern descriptor has been found. If no match has been found, the 1st Interval Matching Function is executed in step 514. The flow logic for that function is shown in FIG. 10, and proceeds in accordance with the following description.

The 1st Interval Matching Function provides a means of adding patterns to the possibility list which match the first interval of the detected signal. This function works in much the same way that the pattern matching function works in that the pattern descriptors are tested one at a time for each of the tones. However, instead of matching the current interval of the detected tone with an indexed interval of each pattern, the current interval of the detected tone is matched with the first interval of each pattern. Then, if that interval is matched, the pattern descriptor is added to the possibility list.

Figure 10:
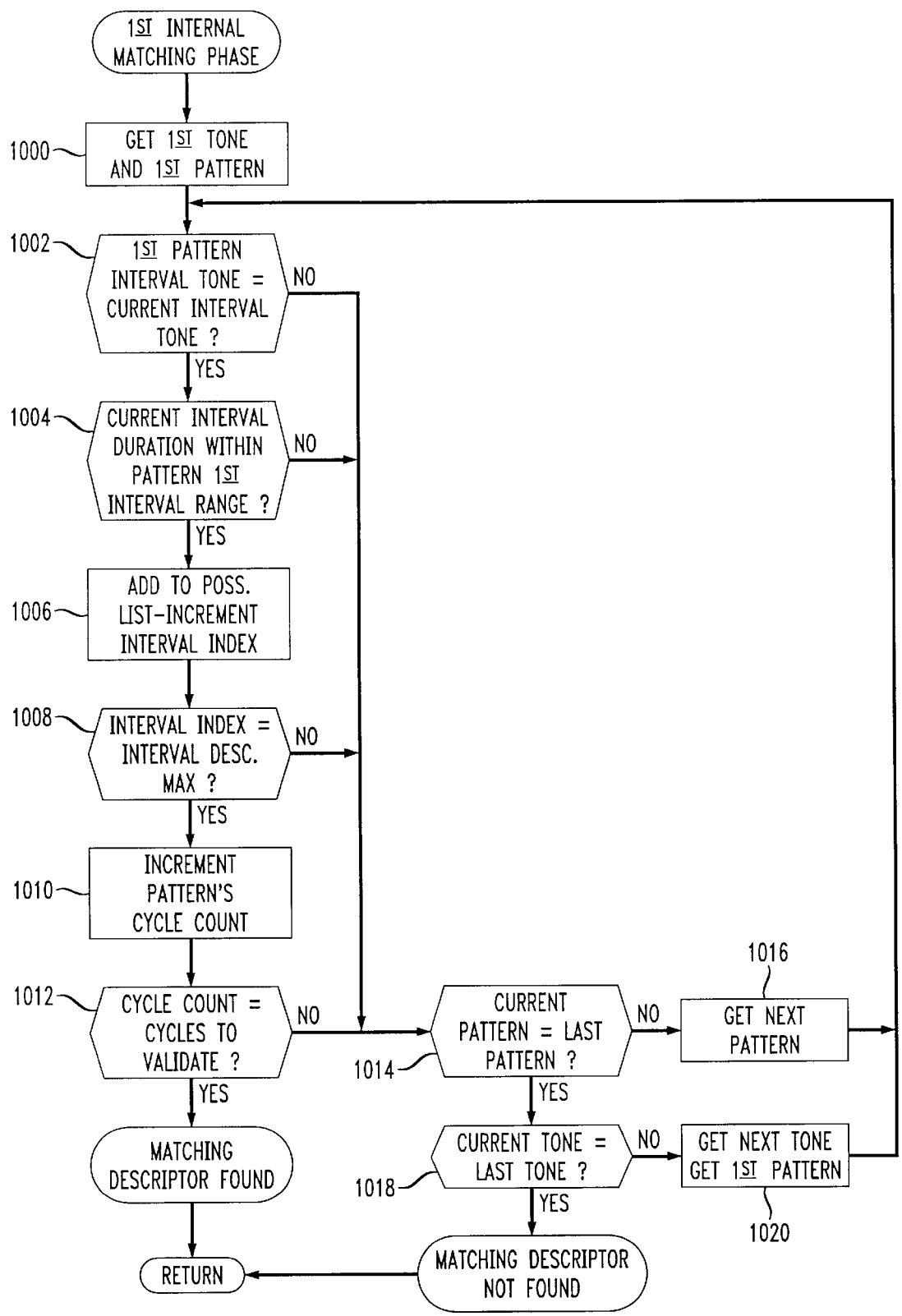
FIG. 10 is a flow diagram of a "1st Interval Matching" function of a method of the present invention.
Figure 11:
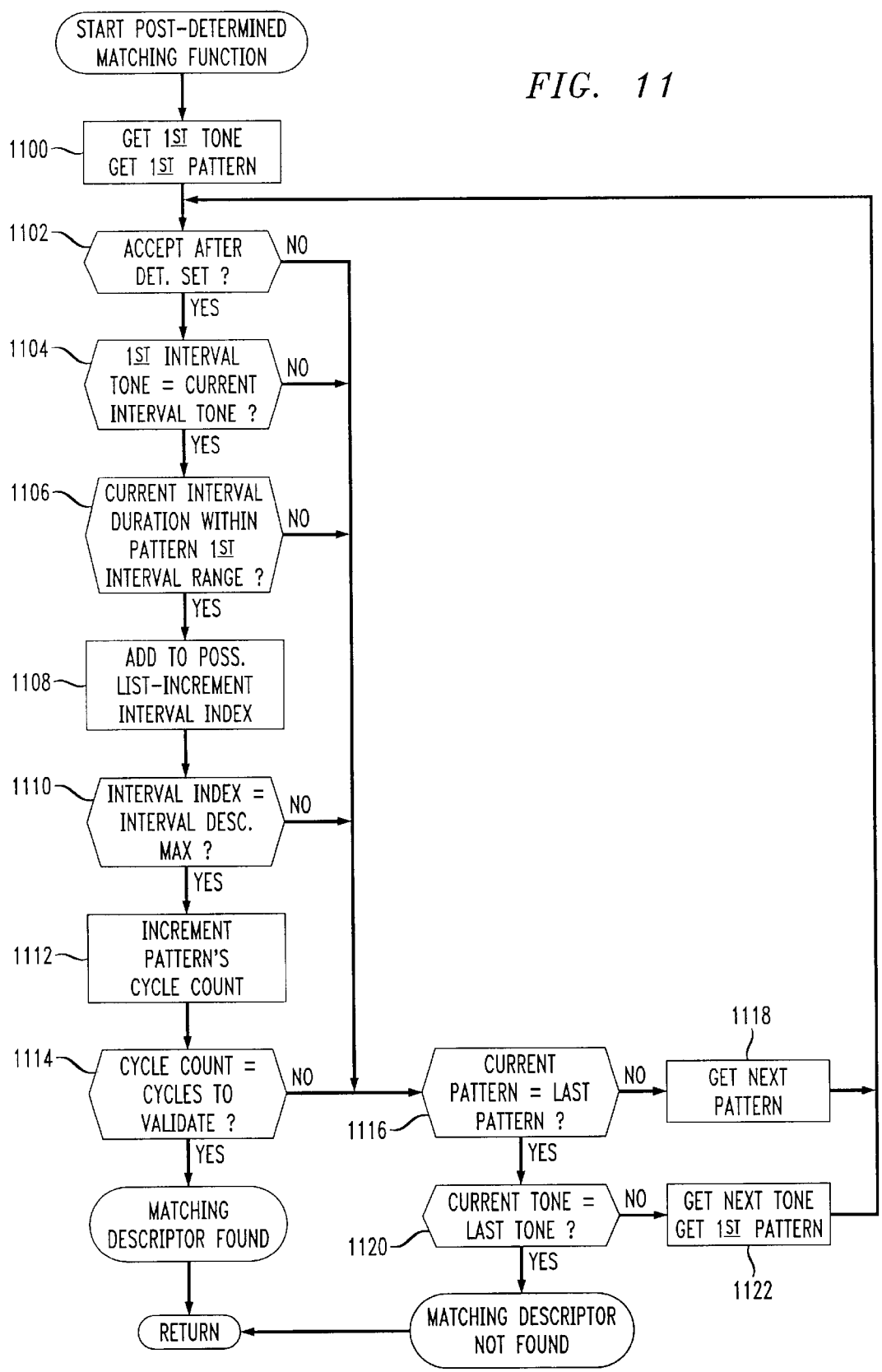
FIG. 11 is a flow diagram of a "Post-determined Matching" function of a method of the present invention.

In step 1000 of FIG. 10, the first pattern descriptor is retrieved to test against the first tone. In step 1002, the current tone is compared to the 1st interval of the pattern under test. If the tone is not found in the first interval of the pattern, steps 1004–1012 are bypassed and the next pattern is retrieved. If the tone is found in the 1st interval, then TC goes on, in step 1004, to test the duration of the tone against the range of the 1st interval of the pattern under test. If the duration does not fall within the designated range, steps 1006–1012 are bypassed. If the duration is within the range specified by the pattern, the pattern descriptor is added to the possibility list in step 1006 and its interval index is incremented.

In step 1008, the current interval index for the pattern under test is compared to the value of INTERVAL DESCRIPTOR MAX for that pattern, as in the matching function. The cycle count of the pattern is incremented in step 1010 if the interval index has reached the INTERVAL DESCRIPTOR MAX and, if not, steps 1010 and 1012 are avoided. After incrementing the cycle count in step 1010, TC proceeds to step 1012 to test the cycle count against the pattern descriptor's specified value for CYCLES TO VALIDATE. If CYCLES TO VALIDATE has been reached, the function terminates and control is returned to the Not-determined phase, with the matching pattern descriptor having been found. Steps 1014–1020 function in the same way as steps 916–922 (FIG. 9) to cycle the function through each pattern and each tone. If no match is found, control is returned to the Not-determined phase, step 516.

Step 516 of the Not-determined phase checks the results of the 1st Interval Matching Function, and transfers control to the Determined phase if a matching pattern descriptor was found. If a match was not found, TC checks the detected interval to determine if it is an interval of silence (step 517). If it is silence, timer MAX SILENCE WAIT is started at step 519, and control is returned to step 500. If it is not silence, the MAX SILENCE WAIT timer is deleted at step 521, and control is returned to step 500. As described above, the MAX SILENCE WAIT timer prevents delays during extended periods of silence.

Determined Phase

Figure 6:
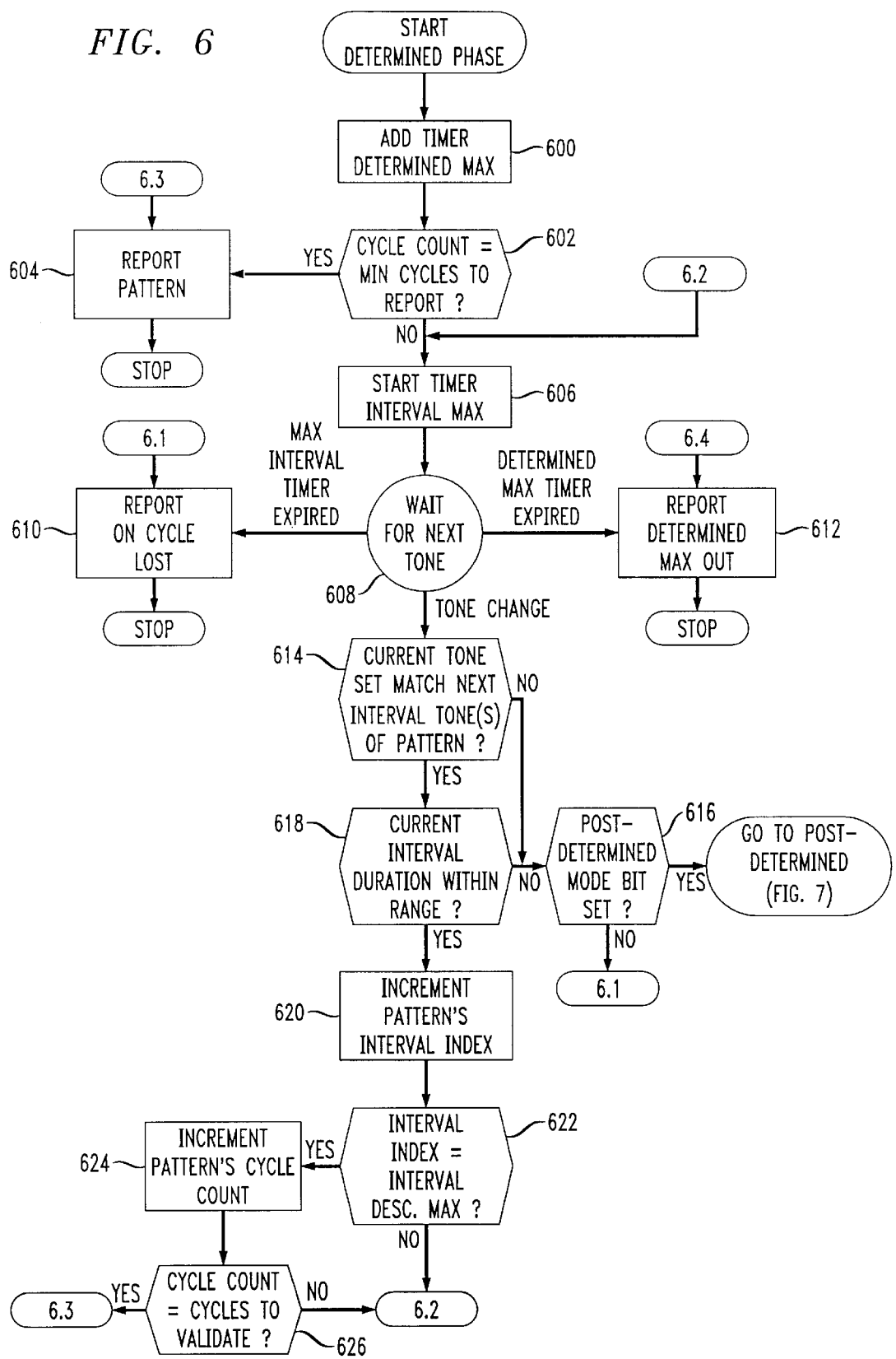
FIG. 6, is a flow diagram of a "Determined" phase of a method of the present invention.

The Determined phase of TC is described by the flow chart of FIG. 6. In the Determined phase, a matching pattern descriptor has already been found, and TC is in a verification stage which is controlled by the configurable parameter MAX CYCLES TO REPORT, which is specified for each pattern descriptor. While CYCLES TO VALIDATE determines how many intervals must be matched before TC accepts the pattern as matching and proceeds to the Determined phase, MAX CYCLES TO REPORT specifies how many intervals must be matched before TC reports the pattern to the host.

In step 600, the timer DETERMINED MAX is started, and control passes to step 602. DETERMINED MAX is a configurable global parameter which limits the amount of time for which TC can remain in the Determined phase. Once this timer is started, the cycle count is tested against MAX CYCLES TO REPORT in step 602. If the cycle count has reached MAX CYCLES TO REPORT, the pattern is reported in step 604, and TC is halted. If the cycle count is still too low, TC proceeds to step 606.

In step 606, timer "Interval Max" is started by TC. The value for this timer is taken from the maximum duration value for the next interval of the pattern descriptor to be matched. As TC then proceeds to wait state 608, expiration of the interval max timer before a tone change allows TC to determine quickly when the pattern has discontinued. In such a case, TC proceeds to step 610 where it reports to the host whatever message is configured for the pattern under test for the field REPORT ON CYCLE LOST. This field can contain any information desired by a user. In the case of ringback type patterns (e.g. ringback and double ringback) which are typically followed by a human voice answering the phone, the pattern loss is usually due to an answer, and an "answer" is preferably reported to the host. It may also be desirable to report the matched pattern descriptor, despite the fact that the value for MAX CYCLES TO REPORT was not reached. Otherwise, an error message can be reported which indicates that the pattern was unmatched. In any case, after the message is reported, TC is halted.

From wait state 608, it is also possible that the Determined Max timer may expire. In such a case, TC reports to the host in step 612 that the Determined Max timer has expired, and the program is halted. If there is a tone change during wait state 608, the "current" interval of the detected signal (i.e. the interval just having ended) is tested against the next interval of the matched pattern. In step 614, the new set of tones is compared to the matched pattern. If it does not match, control passes to step 616, in which TC examines the "Post-determined" mode bit of the matched pattern. If the tone set matches, TC proceeds to compare the interval duration to the range of the matched pattern descriptor in step 618. If the duration does not fall within the required range, TC proceeds to step 616, as above. If it does match the range, the pattern descriptor's interval index is incremented in step 620.

After step 620, the interval index is tested in step 622 against the INTERVAL DESCRIPTOR MAX of the matched pattern descriptor. If it has not yet reached that value, control is returned to step 606, and TC waits for the tone message in step 608. If the INTERVAL DESCRIPTOR MAX has been reached, the pattern's cycle count is incremented in step 624. As in the Not-determined phase, the cycle count is then examined to determine whether it has reached CYCLES TO VALIDATE in step 626. If so, the pattern is reported to the host (step 604) and, if not, control is returned to step 606.

Referring again to step 616, when either the tones or the duration of an interval do not match the previously matched pattern, whether or not TC continues to try to find a matching pattern depends on whether the "Post-determined" mode bit is set for the previously matched pattern. As with the other mode bits, this bit may be configured as desired for a particular end user. If it is not set, control passes to step 610 for a report on cycle lost. If the bit is set, then TC advances to the Post-determined phase.

Post-Determined Phase

In the Post-Determined phase, TC first enters wait state 701 where it waits for the next tone change. If the Determined Max timer expires prior to a tone change, TC proceeds to step 612 (FIG. 6) where a Determined Max Out is reported and TC is halted. If a tone change occurs first, TC executes a "Post-determined Matching" function in step 700. This function is very similar to the 1st Interval Matching function (FIG. 10), in that it causes new pattern descriptors to be placed on the possibility list. The function is demonstrated in detail by the flow chart of FIG. 11.

In step 1100 of the Post-determined matching function, TC prepares for cycling through all of the patterns and tones by retrieving the first of each. The first test for the pattern descriptor is whether one of its mode bits, ACCEPT AFTER DETERMINED, is set to a logic "1". This is a configurable value, and indicates whether the pattern is one which may be matched during the Post-determined phase. If the bit is not set, the pattern under test is not added to the possibility list, and the steps 1104–1114 are bypassed. If this mode bit is set, then TC continues to step 1104.

As in the 1st Interval Matching Function, steps 1104 and 1106 test the first interval of each pattern against each tone and against the duration of the current detected interval. If, for each pattern descriptor, either the tone being examined or the duration does not match, then steps 1108–1114 are bypassed, and the next pattern is retrieved. If the tone and duration match, then the pattern is added to the possibility list and the interval index for that pattern is incremented in step 1108.

Figure 7:
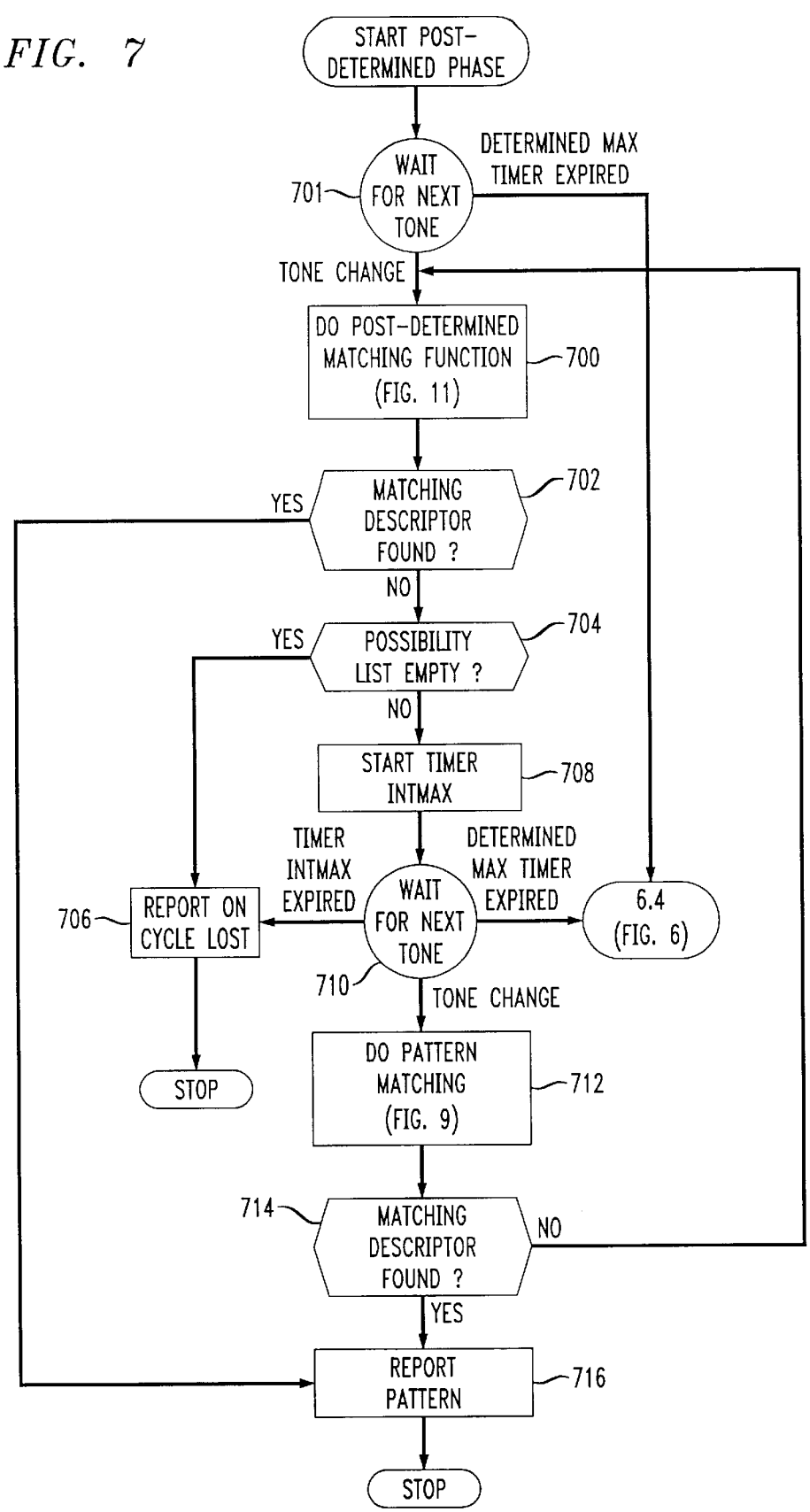
FIG. 7, is a flow diagram of a "Post-determined" phase of a method of the present invention.

The remainder of the post-determined matching function is the same as the 1st interval matching function. In step 1110, the interval index is tested against the INTERVAL DESCRIPTOR MAX for the pattern under test, incrementing the pattern's cycle count in step 1112 if that value has been reached. Also, in step 1114, the cycle count is tested against CYCLES TO VALIDATE for the pattern under test to determine whether a matching pattern descriptor as been found. Steps 1116–1122 are the same as steps 1014–1020 of FIG. 10, and cause TC to cycle through each of the pattern descriptors for each of the tones. After all of the patterns have been tested for all of the tones, control is returned to step 702 (FIG. 7).

If a matching pattern descriptor was found during the Post-determined matching function, TC proceeds from step 702 to step 716 where the matching descriptor is reported to the host. If no match was found, the possibility list is checked in step 704 to determine if it is empty. If it is, then the message in the REPORT ON CYCLE LOST field of the previously matched pattern is reported in step 706, and TC is halted. If the list is not empty, then timer Intmax is started, and TC proceeds to wait state 710.

If timer Intmax expires while in wait state 710, control passes to step 706 where the REPORT ON CYCLE LOST message for the previously matched pattern is reported, after which TC is halted. If the DETERMINED MAX timer expires during the wait state, "Determined Max Out" is reported (step 612, FIG. 6) and TC is halted. If there is a tone change before either of these timers expires, control passes to step 712, where the Pattern Matching function is again invoked (see description above with regard to FIG. 9). If a matching pattern descriptor is found during pattern matching, step 714 passes control to step 716 where the pattern descriptor is reported to the host, and TC is halted. If no match is found, control is returned to step 700.

The method described above, and shown in FIGS. 4–11 provides for a configurable system which may be adapted to the telephone systems of various countries and various localized telecommunications systems as need be. The global parameters which are considered part of the preferred embodiment (some of which are discussed above) are listed in FIG. 12, along with a description of each. Of the global, parameters listed in FIG. 12, those which have not been discussed previously are the maximum glitch "on" time and maximum glitch "off" time, "glob.burst_time" and "glob.max_burst_count".

The glitch logic of the preferred embodiment is independent from the main program logic and is used to filter signal information contained in the messages received from the DSP. Glitch filtering is well-known in the art of signal processing, and serves to allow a program to ignore very short duration changes in signal level caused by noise or other anomalies. In effect, the glitch logic functions as a high pass filter, allowing only those signals (or periods of silence) which exhibit a minimum duration to be passed to the master processor as tones.

In the preferred embodiment, the glitch logic 15 (FIG. 1) is implemented by known means to receive the message data from the DSP and pass it through to the master processor. The portion of a frequency signal which goes from silence to a minimum dBm value for a duration less than the "glob.on_glitch" setting is not passed on. Instead, the frequency signal is determined to have been silence continuously during that time period, despite the "glitch". Similarly, the portion of a frequency signal which drops below a minimum dBm value for a duration shorter than the "glob.off_glitch" setting is also not passed to the master processor. The frequency signal is determined to have been a continuous frequency during that time period.

The parameters "glob.burst_time" and "glob.max_burst_count" are configurable, and define the values of BURST SAMPLE TIME and MAX COUNT PER BURST SAMPLE TIME, respectively. These values are described in detail below in the context of FIG. 13.

Figure 13:
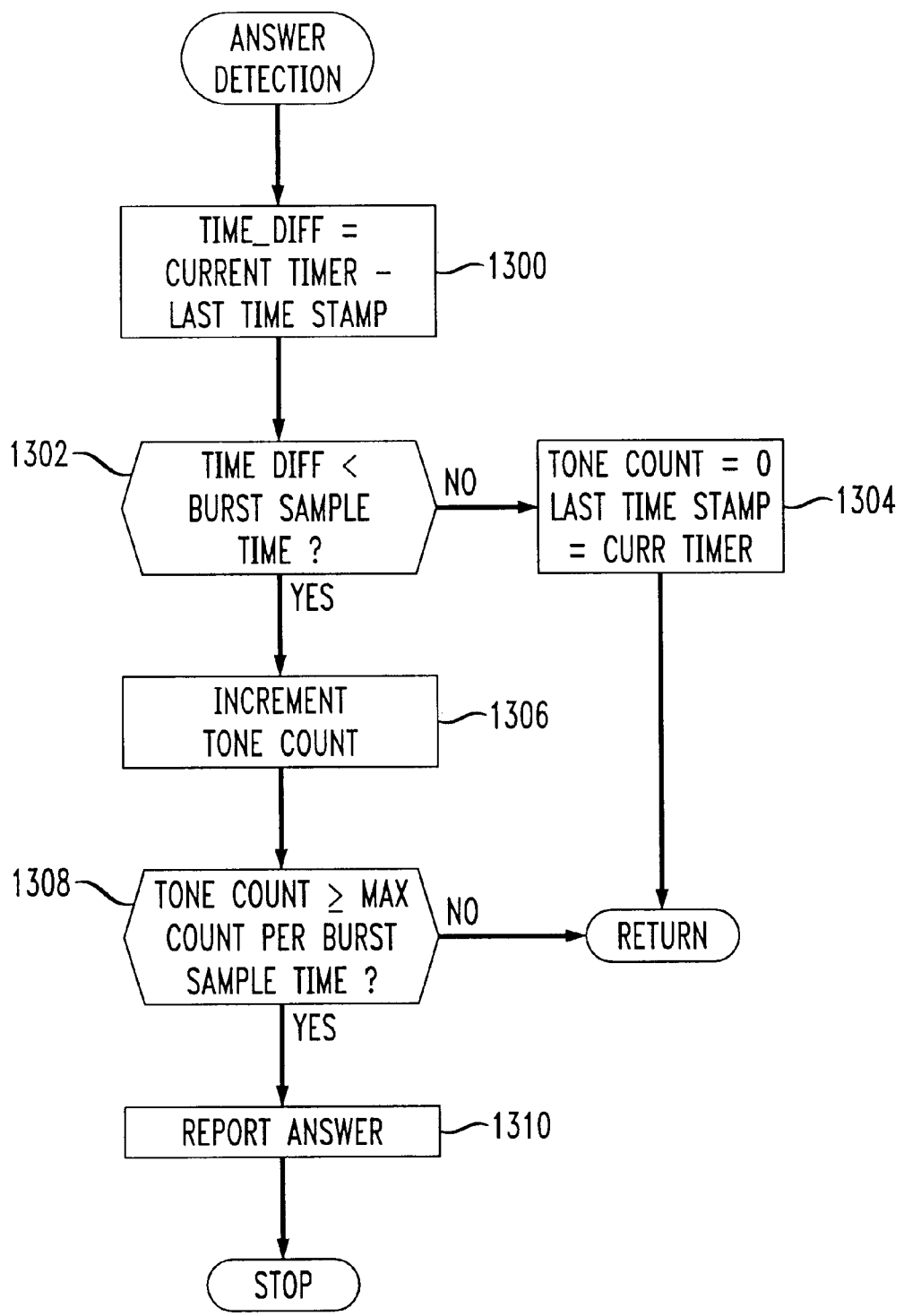
FIG. 13 is a flow diagram of an "Answer Detection" function which may be implemented with the present invention.

Shown in FIG. 13 is the flow logic for an optional Answer Detection function. In the preferred embodiment, this function, when active, causes TC to report an "answer" to the host whenever a predetermined minimum number of tone messages are received within a particular time frame. Because a frequency characteristic of a human voice typically involves numerous frequencies that change quickly with time, a DSP monitoring a channel on which a person answered the call would report a significant number of tone messages over a relatively short period of time. Use of this information allows TC to report an answer to the host more quickly than would otherwise take place within the logic flow of FIGS. 4–11, and thus allows a quicker connection of the call.

When "Answer Detection" is active, the logic of FIG. 13 is invoked each time there is a new tone message. In the preferred embodiment, this logic is executed by the master processor after the appropriate segment of the flow logic of FIGS. 4–11 (although it could just as easily be implemented to run first). Thus, the logic shown in FIG. 13 is executed just prior to entering any of the wait states 408, 416, 502, 608, 701, 710. Although not shown in FIGS. 4–11, those skilled in the art will recognize that the flow shown in FIG. 13 could be easily integrated into the flow charts of FIGS. 4–11.

When the Answer Detection function is invoked, TC, in step 1300, first sets a variable (which TC maintains) called TIME DIFF equal to the value of "CURRENT TIMER"—"LAST TIME STAMP." "CURRENT TIMER" is a free-running timer value which is regularly incremented by the master processor. "LAST TIME STAMP" is a variable maintained by TC and represents a last previous stored value of the current timer (i.e. for the last execution of the Answer Detection logic). Thus, the value of CURRENT TIMER—LAST TIME STAMP is representative of the time since the last storage of LAST TIME STAMP.

In step 1302, the value of TIME STAMP is then tested against the value stored as "BURST SAMPLE TIME." The value of BURST SAMPLE TIME is specified by the configurable global parameter "glob.burst_time," which may be set for the particular user. This parameter is shown in the table of FIG. 12, and represents a measurement time frame during which the number of tone messages is counted. In the preferred embodiment, the value of this parameter is set to 500 ms.

If TIME DIFF is less than the value of BURST SAMPLE TIME, the Answer Detection function returns control to the main detection program after resetting the value of "TONE COUNT" to "0" and setting LAST TIME STAMP equal to the value of CURRENT TIMER in step 1304. TONE COUNT is a variable maintained by TC which is representative of the number of frequency messages which have occurred during the current test period (the total length of the test period being equal to BURST SAMPLE TIME). Since the value of TIME DIFF being greater than (or equal to) BURST SAMPLE TIME necessarily means that an entire test period has expired without a new frequency message being received, the determination is made that an answer has not occurred, and the Answer Detection is halted. Therefore, TONE COUNT is reset to "0" for the next time Answer Detection is run, and LAST TIME STAMP is set to the value of CURRENT TIMER to provide a time stamp value for step 1300 of the next execution of the Answer Detection function.

If, in step 1302, TIME DIFF is determined to be less than BURST SAMPLE TIME, the value of TONE COUNT is incremented in step 1306. TONE COUNT is then compared, in step 1308, to MAX COUNT PER BURST SAMPLE TIME, the value of which is specified by configurable, global parameter glob.max_burst_count (shown in FIG. 12). This value is configured for the particular system user, and represents the number of tone changes within a time span specified by BURST SAMPLE TIME for which the Answer Detection function reports an "Answer" to the host. Thus, if TONE COUNT is less than MAX COUNT PER BURST SAMPLE TIME (step 1308), the Answer Detection function is terminated, and control is returned to the point in the main detection program from which the function was invoked. However, if TONE COUNT is determined in step 1308 to be greater than or equal to MAX COUNT PER BURST SAMPLE, TC reports "Answer" in a message to the host (step 1310), and is then halted.

As mentioned above, the use of the Answer Detection function is optional, and may be enabled or disabled by the specification of the parameters glob.burst_time and glob.max_burst_count. By setting glob.burst_time (and therefore BURST SAMPLE TIME) to a value smaller than any possible value for TIME DIFF (i.e. "0"), the Answer Detection function is disabled. Therefore, the system may be configured such that the only reporting of answer results during the execution of the flow logic of FIGS. 4–11.

Frequency Mask Embodiment

Figure 14:
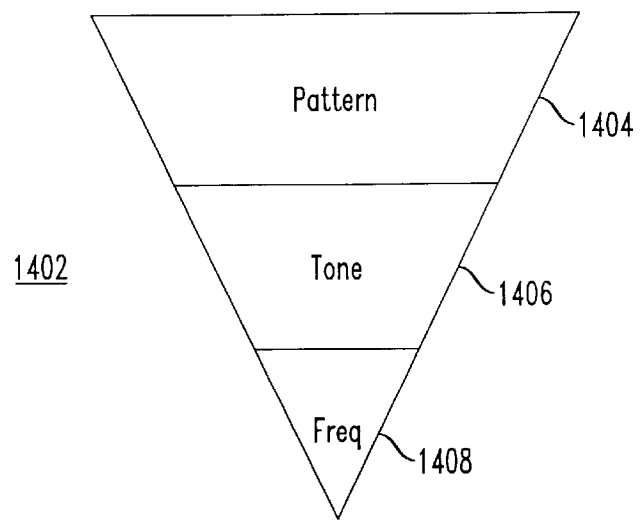
FIG. 14 is a schematic diagram of the relationship between patterns, tones, and frequencies in accordance with the present invention.

In accordance with a preferred embodiment of the invention, a frequency mask is employed. Turning to FIG. 14, the background to this aspect of the invention will be discussed. Diagram 1402 illustrates the relationship between patterns, tones and frequencies. Patterns 1404 are formed of intervals of tones 1406. Tones 1406 are formed of combinations of one or more frequencies 1408.

Figure 15:
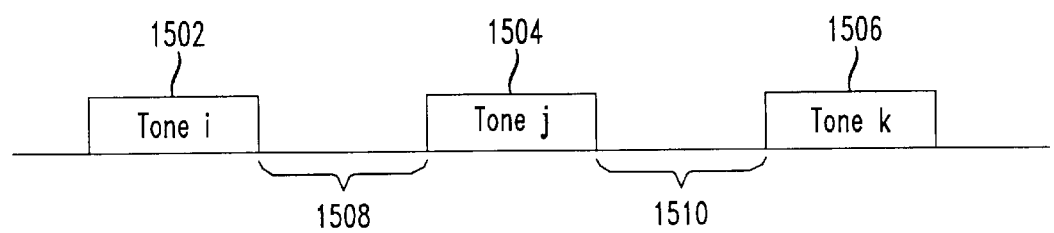
FIG. 15 is a schematic illustration of a pattern consisting of various tones.

FIG. 15 illustrates the concept that different tones can make up patterns in an interval. More specifically a pattern 1404 consists of tone intervals such as 1502, 1504 and 1506 which are separated by intervals of silence 1508, 1510. Tones such as the tone j 1504 in each interval may be different. More specifically, in accordance with this aspect of the invention patterns consisting of tone intervals in which the tones within those intervals are different can still be detected.

Figure 16:
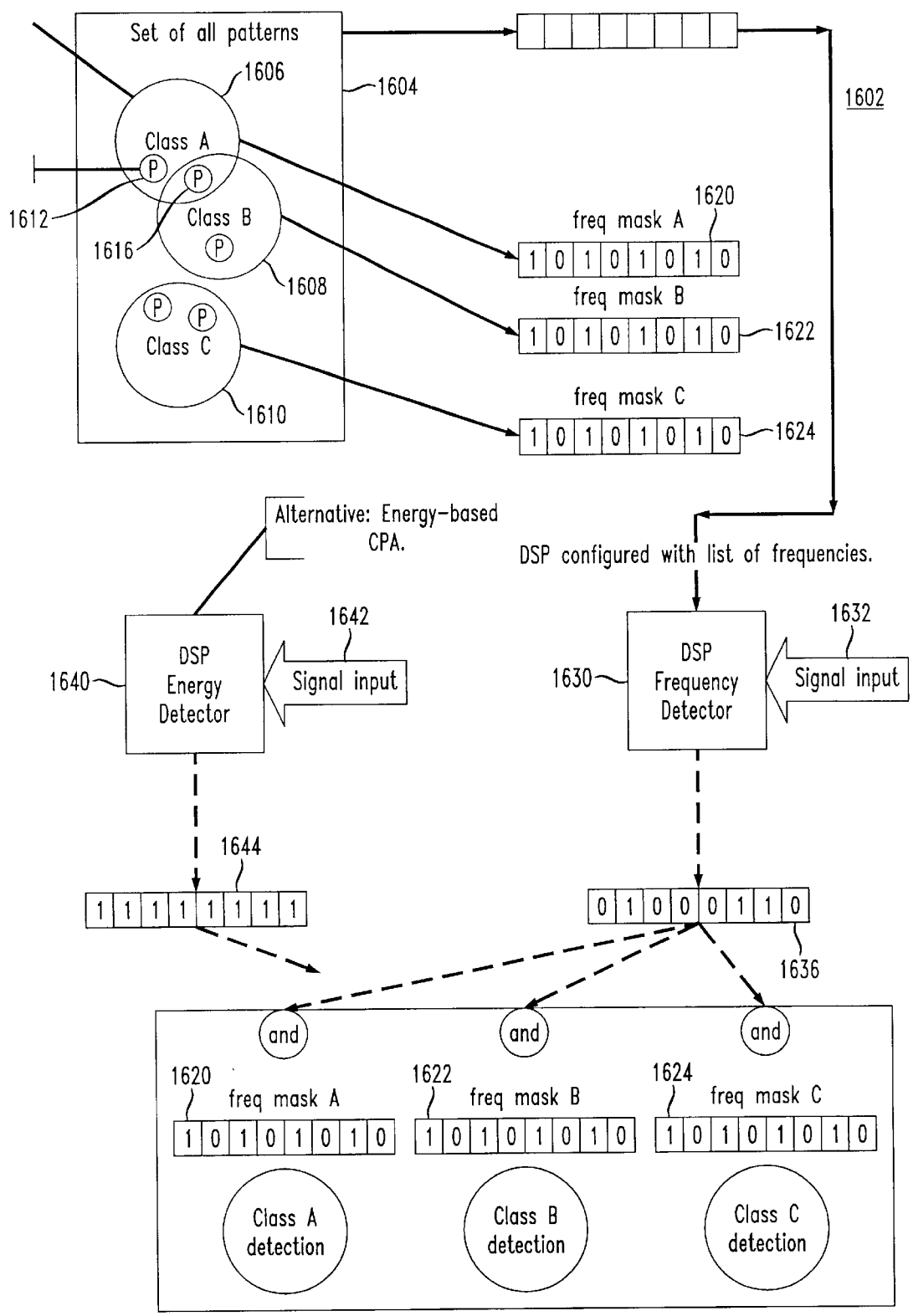
FIG. 16 is a schematic flow diagram of a pattern formed into group of classes in accordance with the present invention, and the information being processed by a DSP card on which one DSP chip is programmed as an energy detector and a second DSP chip is programmed as a frequency detector.

As illustrated in FIG. 16, we will describe how the present invention allows the frequencies and tones detected by the switch to be customized. (Previously, patterns could be customized, however, in accordance with the present aspect of the invention, frequencies are combined to create call progress tones which are then combined during sequential intervals of time to form call progress patterns.) In accordance with this embodiment of the invention, a frequency mask is computed that is specific to each call progress analysis class. As shown in the flow diagram 1602 a set of all patterns 1604 is shown. Patterns are grouped as classes, such as class A, 1606, class B, 1608, and class C, 1610. The classes are defined for conveniently designating subgroups of patterns during call progress reception. For example, a customer can set Class A to include patterns in North America and class B can identify European patterns. Alternatively, different types of North American patterns can be placed within one class. For example, the ringing tone and busy pattern may be class A. Class B may be the "zip tone" (series of tones indicating a number not in service). An individual pattern as shown in the encircled P 1612 may fall within both class A and class B as shown in the intersection 1616 in FIG. 16.

For each class, frequency masks, employing only those frequencies applicable to that class, are computed. More specifically, a frequency mask is used to cause the DSP receiver to ignore frequencies that are not part of any CP pattern in a call progress analysis class. In other words the DSP is initially configured to detect all frequencies, but the frequency mask then causes it to ignore frequencies which are not of concern for that particular class. This allows each DSP to perform frequency detection that is customized to each channel, which in turn reduces the false alarm rate of detection. (False alarm rate is a fraction of instances in which the detector reports a call progress pattern on the channel when, in fact, that pattern is not actually present).

Turning to FIG. 16, frequency mask A, 1620 corresponds with class A, 1606. Similarly, frequency mask B, 1622 corresponds with class B, 1608 and frequency mask C 1624 corresponds with class C 1610. Thus, for class A, (which in the example is identified as the ring back and busy patterns), all frequencies which are expected to occur in those patterns are allowed to be present and other frequencies which would not occur during a ring back or busy signal are masked out. Thus, the DSP looks for frequencies of interest. Proceeding along the flow diagram 1602, the DSP is configured with a list of frequencies. The DSP has been programmed as a frequency detector 1630. The signal input such as the signal which is present upon a call being answered is what usually would be either a ringing or busy signal is input to the frequency detector. The frequency detector detects frequencies at regular, periodic intervals. The frequencies detected are illustrated in block 1636. Now the pattern matching logic such as a cadence detector scan for each class using the frequency mask for that class. These frequency masks mask out any frequencies which are not expected to be present for each class and the patterns in that class are then detected and matched using the pattern matching logic to determine what call progress signals are present on the channel.

It should be understood that the detector of the present invention scans for each frequency independently and scans simultaneously for all frequencies for all call progress patterns of interest. More specifically, the "on" transitions reported by the DSP are now converted into the class specific frequency mask when they arrive in TC. Because the class specific frequency mask is used the TC software tries to match exactly those TC patterns that are part of the desired CPA class, this reduces a false alarm rate of the detection.

Energy Detection Mode

As shown in the left side alternative path of flow diagram 1602, the alternative embodiment provides for energy-based call progress analysis. In this case, the DSP 1640 which runs in a DSP chip 16 on the DSP card 16, is programmed as an energy detector. The energy detector listens to the sound on a channel and declares "on" and "off" transitions as the sound goes above or below a threshold. The call progress analysis software in the TC task then uses the cadence of the on/off transitions to decide which call progress pattern is present on the channel. The actual frequencies that are on the channel do not matter in this mode. However, we still use a frequency mask that is computed and is specific to each CPA class. When energy is present, the energy detector reports that all frequencies are present. The pattern matching logic then applies the frequency masks applicable to each class to mask in the frequencies that are needed in that particular class. Energy detection is less specific and this allows the TC to use its frequency detection pattern matching techniques when performing the energy detection. The same software that performs all the deglitching and pattern matching can be reused. Also, the same database of tone descriptors, patterns and classes can be reused. The reuse of this software and database means that the CPA feature of the switch behaves consistently in frequency mode or energy mode.

The terms and expressions employed herein are terms of description and not of limitation. In their use, there is no intention of excluding any equivalents of the features shown and described. It is recognized that various modifications are possible within the scope of the invention claimed. In addition, other modifications and changes will be apparent to those skilled in the art. Such changes and modifications are intended to be within the scope of the appended claims.

What is claimed is:

1. A method of identifying a call progress signal comprising:

detecting, with a signal detector, a telecommunications signal having a different set of detected frequencies present during each of a plurality of detection intervals and providing an output indicative of the frequencies detected;

configuring a list of signal pattern descriptors each of which describes a different signal pattern by stored parameters which identify descriptor frequencies and duration ranges for each of a plurality of descriptor intervals of the defined pattern;

comparing the output of the signal detector with the descriptors on the list;

determining, for each descriptor on the list, if the detected frequencies match the identified descriptor frequencies;

determining, for each descriptor on the list, if durations of the detection intervals are encompassed by the duration ranges of the descriptor intervals; and providing an output indicative of a descriptor on the list for which the detected frequencies match the descriptor frequencies and the durations of the detection intervals are encompassed by the duration ranges of the descriptor intervals.

2. A method according to claim 1 wherein configuring a list of signal pattern descriptors comprises configuring a list of pattern descriptors each of which has specified, for each of said descriptor intervals, at least one frequency which is present during that entire interval.

3. A method according to claim 1 wherein providing an output of a descriptor on the list comprises providing an output of a descriptor on the list for which the detected frequencies match the descriptor frequencies, and the durations of the detected intervals are encompassed by the duration ranges of the descriptor intervals for each of a predetermined number of consecutive detected intervals.

4. A method according to claim 3 wherein configuring a list of signal pattern descriptors further comprises configuring for each of said descriptors an interval match minimum which is used as said predetermined number of consecutive intervals.

5. A method according to claim 1 further comprising configuring a list of tone descriptors each of which specifies at least one frequency and a threshold energy level for that frequency.

6. A method according to claim 5 wherein configuring a list of signal pattern descriptors comprises configuring a list of signal pattern descriptors each of which describes a different signal pattern by stored parameters which identify descriptor frequencies by referencing a tone descriptor.

7. A method according to claim 5 wherein configuring a list of tone descriptors comprises configuring a list of tone descriptors which describe each of a plurality of tones conventionally used to generate the call progress signals of a particular public telephone network.

8. A method according to claim 1 wherein detecting a telecommunications signal with a signal detector comprises detecting a telecommunications signal with a digital signal processor.

9. A method according to claim 1 wherein configuring a list of signal pattern descriptors comprises configuring a list of signal pattern descriptors each of which describes a signal pattern conventionally descriptive of the call progress signals of a particular public telephone network.

10. A method according to claim 1 wherein comparing the output of the signal detector with the descriptors on the list comprises comparing the output of the signal detector with the descriptors on the list with a data processor.

11. A method according to claim 1 wherein comparing the output of the signal detector with the descriptors on the list with a data processor comprises using a microprocessor.

12. A method according to claim 1 wherein comparing the output of the signal detector with the descriptors on the list comprises delaying the comparison of the signal detector output with the descriptors on the list until after a first detection interval for which the detected frequencies indicate silence and a second detection interval for which the detected frequencies indicate the presence of non-silence frequencies.

13. A method according to claim 1 wherein determining if the detected frequencies match the identified descriptor frequencies and determining if the durations of the detection intervals are encompassed by the duration ranges of the descriptor intervals comprises identifying a single pattern descriptor which identifies frequencies which match the detected frequencies for a predetermined number of consecutive detected intervals, and which identifies duration ranges for a plurality of descriptor intervals which encompass the durations of said consecutive detected intervals.

14. A method according to claim 13 wherein determining if the detected frequencies match the identified descriptor frequencies and determining if the durations of the detection intervals are encompassed by the duration ranges of the descriptor intervals comprises, after identifying said single pattern descriptor, providing an output indicative s of said single pattern descriptor only if the descriptor frequencies of the single pattern descriptor continue to match the detected frequencies and the descriptor interval duration ranges of the single pattern descriptor continue to encompass the detected interval durations for a predetermined number of subsequent intervals.

15. A method according to claim 14 wherein said predetermined number of subsequent intervals is specified by a parameter specific to said single pattern descriptor.

16. A method according to claim 14 wherein, if the descriptor frequencies and the interval durations of the single pattern descriptor do not continue to match the detected frequencies and encompass the detected interval durations, respectively, for said predetermined number of subsequent intervals, the method continues only if said single pattern descriptor includes a detectable element indicating that the method should continue.

17. A method according to claim 1 wherein the step of comparing the output of the signal detector with the descriptors on the list comprises doing said comparing after each of the detected intervals is detected.

18. A method according to claim 17 wherein the step of comparing the output of the signal detector with the descriptors on the list further comprises comparing consecutive intervals of the signal detector output with intervals of said plurality of descriptor intervals described as being consecutive such that:

detected frequencies detected during a first interval of the detected signal are compared to frequencies identified by a first pattern descriptor as being associated with a first descriptor interval, and a duration of said first interval of the detected signal is compared to a duration range identified by said first pattern descriptor as being associated with said first descriptor interval; and detected frequencies detected during a second interval of the detected signal are compared to frequencies identified by the first pattern descriptor as being associated with a second descriptor interval, and a duration of said second interval of the detected signal is compared to a duration range identified by said first pattern descriptor as being associated with said second descriptor interval.

19. A method according to claim 18 wherein the steps of determining if the detected frequencies match the identified descriptor frequencies, and determining if the durations of the detection intervals are encompassed by the duration ranges of the descriptor intervals comprise generating a modified list of signal pattern descriptors after each of said detected intervals is detected, the modified list including only those descriptors which, for a next previous consecutive interval of the detected signal, have descriptor frequencies which were compared to and found to match detected frequencies detected during said last consecutive interval, and have a descriptor duration range which was compared to and found to encompass an interval duration of said last consecutive interval.

20. A method according to claim 19 wherein the steps of determining if the detected frequencies match the identified descriptor frequencies, and determining if the durations of the detection intervals are encompassed by the durations of the descriptor intervals further comprises generating said modified list of signal pattern descriptors after each of said detected intervals is detected until only a single pattern descriptor remains on said modified list.

21. A method of detecting a call progress signal comprising:

detecting, with a signal detector, a telecommunications signal having a different set of detected frequencies present during each of a plurality of detection intervals and providing an output indicative of the frequencies detected;

configuring a list of signal pattern descriptors each of which describes a different signal pattern by stored parameters which identify descriptor frequencies and duration ranges for each of a plurality of descriptor intervals of the defined pattern;

comparing, for each of said pattern descriptors on the list, consecutive intervals of the the signal detector output with intervals identified as being consecutive by the pattern descriptor such that:

detected frequencies detected during a first interval of the detected signal are compared to frequencies identified by said pattern descriptor as being associated with a first descriptor interval, and a duration of said first interval of the detected signal is compared to a duration range identified by said pattern descriptor as being associated with said first descriptor interval; and detected frequencies detected during a second interval of the detected signal are compared to frequencies identified by said pattern descriptor as being associated with a second descriptor interval, and a duration of said second interval of the detected signal is compared to a duration range identified by said pattern descriptor as being associated with said second descriptor interval;

determining, for each descriptor on the list, and for each of said consecutive intervals of the signal detector output and the descriptor interval of each descriptor to which it is compared, if the detected frequencies match the descriptor frequencies identified as being associated with said compared descriptor interval, and if the detected interval duration is encompassed by the duration range identified as being associated with said compared descriptor interval;

modifying said list of signal pattern descriptors after each of said detected intervals is detected, a modified list including only those descriptors which, for a next previous consecutive interval of the detected signal, have descriptor frequencies which were compared to and found to match detected frequencies detected during said last consecutive interval, and have a descriptor duration range which was compared to and found to encompass an interval duration of said last consecutive interval; and providing an output indicative of a last remaining descriptor on the list.

22. A call progress analysis system comprising:

a signal detector for detecting a telecommunications signal having a different set of detected frequencies present during each of a plurality of detection intervals and providing an output indicative of the frequencies detected;

a list of signal pattern descriptors each of which describes a different signal pattern by stored parameters which identify descriptor frequencies and duration ranges for each of a plurality of descriptor intervals of the defined pattern;

means for comparing the output of the signal detector with the descriptors on the list;

means for determining, for each descriptor on the list, if the detected frequencies match the identified descriptor frequencies;

means for determining, for each descriptor on the list, if durations of the detection intervals are encompassed by the duration ranges of the descriptor intervals; and means for providing an output indicative of a descriptor on the list for which the detected frequencies match the descriptor frequencies and the durations of the detection intervals are encompassed by the durations ranges of the descriptor intervals.

23. A system according to claim 22 wherein the means for providing an output of a descriptor on the list outputs a descriptor on the list for which the detected frequencies match the descriptor frequencies, and the durations of the detected intervals are encompassed by the duration ranges of the descriptor intervals for each of a predetermined number of consecutive detected intervals.

24. A system according to claim 23 wherein the list of pattern descriptors comprises, for each of said descriptors, an interval match minimum which is used as said predetermined number of consecutive intervals.

25. A system according to claim 22 further comprising a list of tone descriptors each of which specifies at least one frequency and a threshold energy level for that frequency.

26. A system according to claim 25 wherein each signal pattern descriptor comprises stored parameters which identify descriptor frequencies by referencing a tone descriptor.

27. A system according to claim 22 wherein the signal detector comprises a digital signal processor.

28. A system according to claim 22 wherein the means for comparing the output of the signal detector with the descriptors on the list comprises a data processor.

* * * * *